(12) United States Patent
George

(10) Patent No.: US 10,339,102 B2
(45) Date of Patent: Jul. 2, 2019

(54) AUTOMATING SCRIPT CREATION FOR A LOG FILE

(71) Applicant: VMware, Inc., Palo Alto, CA (US)

(72) Inventor: Moses George, Fremont, CA (US)

(73) Assignee: VMware, Inc., Palo Alto, CA (US)

( * ) Notice: Subject to any disclaimer, the term of this patent is extended or adjusted under 35 U.S.C. 154(b) by 343 days.

(21) Appl. No.: 15/282,832

(22) Filed: Sep. 30, 2016

(65) Prior Publication Data
US 2018/0095983 A1 Apr. 5, 2018

(51) Int. Cl.
*G06F 16/00* (2019.01)
*G06F 16/14* (2019.01)
*G06F 16/16* (2019.01)
*G06F 9/44* (2018.01)
*G06F 8/30* (2018.01)
*G06F 9/455* (2018.01)
*G06F 9/451* (2018.01)

(52) U.S. Cl.
CPC .............. *G06F 16/148* (2019.01); *G06F 8/30* (2013.01); *G06F 9/44* (2013.01); *G06F 9/451* (2018.02); *G06F 9/45512* (2013.01); *G06F 16/156* (2019.01); *G06F 16/168* (2019.01)

(58) Field of Classification Search
CPC ........ G06F 16/148; G06F 16/168; G06F 9/44; G06F 9/45512; G06F 9/451; G06F 8/30
See application file for complete search history.

(56) References Cited

U.S. PATENT DOCUMENTS

| 8,533,193 B2 * | 9/2013 | Hubbard | G06F 17/30637 707/737 |
| 2001/0029507 A1 * | 10/2001 | Nojima | G06F 17/30067 |
| 2012/0311527 A1 * | 12/2012 | Lee | G06F 17/30902 717/106 |
| 2016/0142773 A1 * | 5/2016 | Terui | G06F 17/30017 725/14 |
| 2017/0011101 A1 * | 1/2017 | Venkatesan | G06F 11/079 |

* cited by examiner

*Primary Examiner* — Tarek Chbouki
(74) *Attorney, Agent, or Firm* — Clayton, McKay & Bailey, PC

(57) ABSTRACT

In a computer-implemented method for automating script creation for a log file, a log file for a component is displayed. A selection of a string within the log file is received. At least one operation to be performed on the log file using the string is received. The at least one operation is performed on the log file using the string. A script based on the operation and the string is automatically created. The script is stored such that it is accessible for use in other log files.

20 Claims, 21 Drawing Sheets

- DSL
- vDebug
- Preferences

530

| | |
|---|---|
| 1a460573 | 2015-06-23T13:12:38.062-07:00 [05448 info 'Vpxd::Vm' o pID=1a460573] [VmMo::InitMinEVCKeyIfNecessary] Initializing min EVC key for VM Mos114 [vim.VirtualMachine:vm-84] |
| 1a460573 | 2015-06-23T13:12:38.155-07:00 [05448 info 'Vpxd::Vm' o pID=1a460573] [VmMo::InitMinEVCKeyIfNecessary] Initializing min EVC key for VM Mos113 [vim.VirtualMachine:vm-83] |
| 35fe9175-e9 | 2015-06-23T13:55:52.513-07:00 [05260 info 'Vpxd::Vm' o pID=35fe9175-e9] [VmMo::InitMinEVCKeyIfNecessary] Initializing min EVC key for VM VMMos1 [vim.VirtualMachine:vm-105] |
| 59fe7676-8e | 2015-06-23T16:06:46.019-07:00 [05376 info 'Vpxd::Vm' o pID=59fe7676-8e] [VmMo::InitMinEVCKeyIfNecessary] Initializing min EVC key for VM VMMos2 [vim.VirtualMachine:vm-106] |
| 53044f07-6c | 2015-06-23T16:06:46.820-07:00 [01376 info 'Vpxd::Vm' o pID=53044f07-6c] [VmMo::InitMinEVCKeyIfNecessary] Initializing min EVC key for VM VMMos3 [vim.VirtualMachine:vm-107] |

[Push To Production] [Close]

AUTOMATING SCRIPT CREATION FOR A LOG FILE

BACKGROUND

As computing technology advances, the complexity of interoperations of correlated software components also increases. Accordingly, many products utilize multiple levels of software components. For example, VMware Horizon View works on top of VMware vCenter™, which in turn works with ESX hosts. Interoperability issues and/or errors may occur from time to time, and these issues and/or errors should be resolved expeditiously to ensure proper interoperation of correlated software components.

BRIEF DESCRIPTION OF DRAWINGS

The accompanying drawings, which are incorporated in and form a part of the Description of Embodiments, illustrate various embodiments of the subject matter and, together with the Description of Embodiments, serve to explain principles of the subject matter discussed below. Unless specifically noted, the drawings referred to in this Brief Description of Drawings should be understood as not being drawn to scale. Herein, like items are labeled with like item numbers.

FIGS. 4A-K illustrate screenshots of example graphical user interfaces for automating script creation for log files, in accordance with various embodiments.

FIGS. 5A-C illustrate screenshots of example graphical user interfaces for searching and executing save scripts, in accordance with various embodiments.

DESCRIPTION OF EMBODIMENTS

Figure 1:
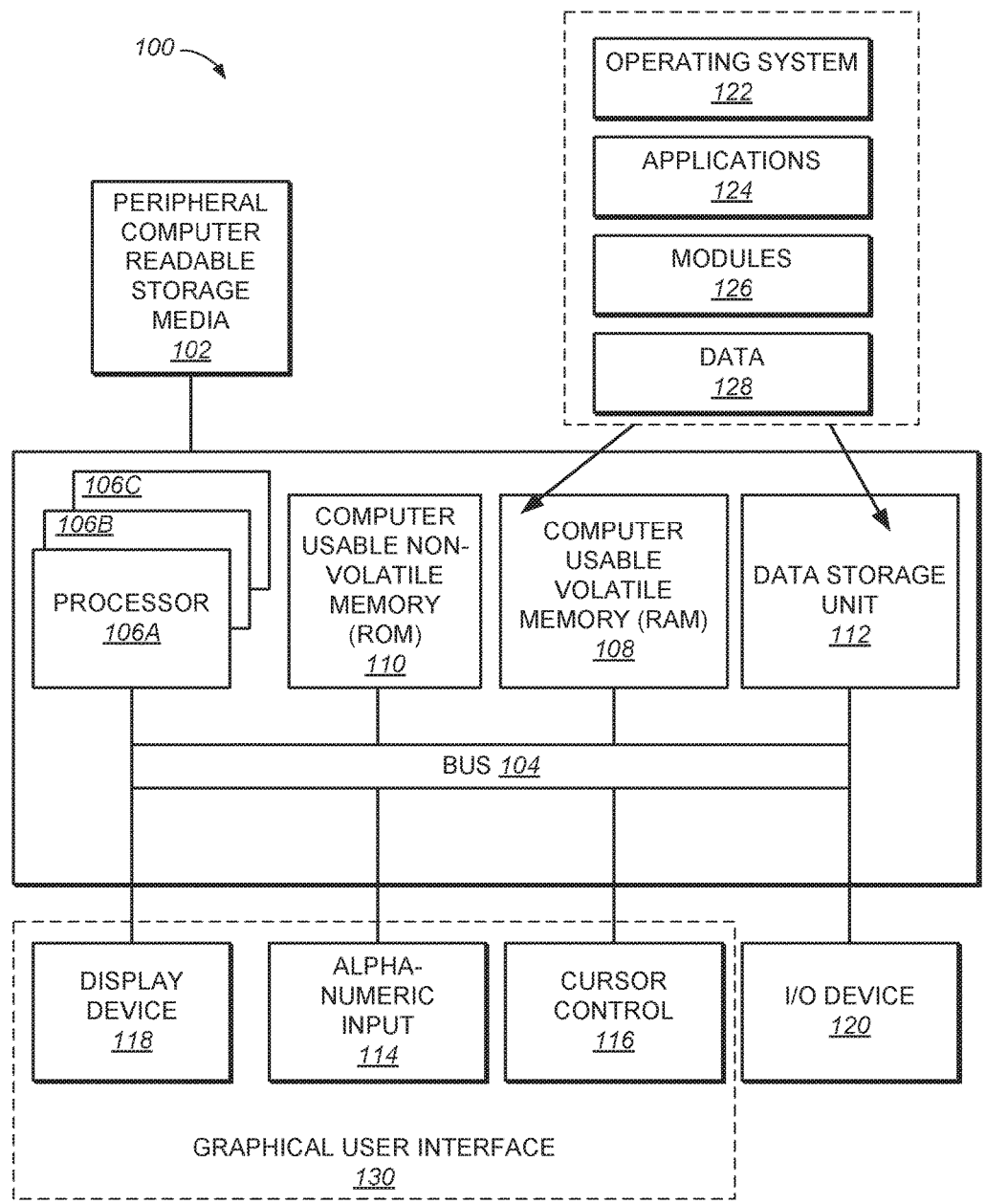
FIG. 1 illustrates an example computer system upon which embodiments of the present invention can be implemented.

Reference will now be made in detail to various embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications and equivalents, which may be included within the spirit and scope the various embodiments as defined by the appended claims. Furthermore, in this Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Notation and Nomenclature

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be one or more self-consistent procedures or instructions leading to a desired result. The procedures are those requiring physical manipulations of physical quantities. Usually, although not necessarily, these quantities take the form of electrical or magnetic signals capable of being stored, transferred, combined, compared, and otherwise manipulated in an electronic device.

It should be borne in mind, however, that all of these and similar terms are to be associated with the appropriate physical quantities and are merely convenient labels applied to these quantities. Unless specifically stated otherwise as apparent from the following discussions, it is appreciated that throughout the description of embodiments, discussions utilizing terms such as "displaying," "receiving," "performing," "creating," "storing," "generating," "filtering," "updating," "using," "providing," or the like, refer to the actions and processes of an electronic computing device or system such as: a host processor, a processor, a memory, a virtual storage area network (VSAN), a virtualization management server or a virtual machine (VM), among others, of a virtualization infrastructure or a computer system of a distributed computing system, or the like, or a combination thereof. It should be appreciated that the virtualization infrastructure may be on-premises (e.g., local) or off-premises (e.g., remote or cloud-based), or a combination thereof. The electronic device manipulates and transforms data represented as physical (electronic and/or magnetic) quantities within the electronic device's registers and memories into other data similarly represented as physical quantities within the electronic device's memories or registers or other such information storage, transmission, processing, or display components.

Embodiments described herein may be discussed in the general context of processor-executable instructions residing on some form of non-transitory processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example mobile electronic device described herein may include components other than those shown, including well-known components.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, perform one or more of the methods described herein. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors, such as one or more motion processing units (MPUs), sensor processing units (SPUs), host processor(s) or core(s) thereof, digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structures or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of an SPU/MPU and a microprocessor, a plurality of microprocessors, one or more microprocessors in conjunction with an SPU core, MPU core, or any other such configuration.

Overview of Discussion

Discussion begins with a description of an example computer system environment, upon which embodiments of the present invention may be implemented. An example computing environment, upon which embodiments of the present invention may be implemented, is then discussed. Example graphical user interfaces associated with automatically creating a script for a log file, in accordance with various embodiments, are then described. Example operations of the example graphical user interfaces are then described.

Example embodiments described herein provide a method for automatically creating a script for a log file using a graphical user interface. In one embodiment, a computer-implemented method for automating script creation for a log file is described. A log file for a component is displayed. A selection of a string within the log file is received. At least one operation to be performed on the log file using the string is received. The at least one operation is performed on the log file using the string. A script based on the operation and the string is automatically created. The script is stored such that it is accessible for use in other log files.

Many software products work with and utilize multiple levels of software components. For example, VMware Horizon View works on top of VMware vCenter™ which in turn works with ESX hosts. The operations of these software components are often correlated, such that a bug, error, or other issue in one component, may impact the operation or performance of another component. Software components record and maintain log data (e.g., in a log file) associated with the execution and performance of the software component. One use of the log data is to provide software engineers and software support agents with a means for analyzing the performance of the software component, for example in the instance of a bug or other performance issue.

For example, when a bug or other issue is detected, log files from all correlated software components can be retrieved an analyzed. Typically, these log files are manually searched to find corresponding log lines between the log files in an effort to perform debugging or error resolution. Scripting is frequently used to assist in debugging software components. However, currently script writing is manually performed, and it is difficult to apply scripts written for one log file to another log file.

Embodiments described herein provide graphical user interfaces, and methods for using the graphical user interfaces, that automate script creation for use in log files for different software components. In various embodiments, the graphical user interface displays multiple log files for different software components. Various operations can be performed on the log files, and the text of the displayed log files is selectable for performing at least some of these operations. Scripts for these operations are automatically created and saved, such that the script is accessible for use in other log files.

For example, in one embodiment, a search operation can be performed on a log file according to a selected string of the log file, providing a filtered version of the log file that only displays lines of the log file that include the selected string. In another embodiment, a selected string can be set as a variable (e.g., a variable setting operation or a set as variable operation), where a search pattern is defined and a variable associated with the search pattern is defined. In another embodiment, a search with variable operation is performed, where a previously stored variable is searched in another log file. It should be appreciated that in accordance with the described embodiments, scripts for these operations are automatically created and saved, such that the scripts is accessible for use in other log files.

Example Computer System Environment

With reference now to FIG. 1, all or portions of some embodiments described herein are composed of computer-readable and computer-executable instructions that reside, for example, in computer-usable/computer-readable storage media of a computer system. That is, FIG. 1 illustrates one example of a type of computer (computer system 100) that can be used in accordance with or to implement various embodiments which are discussed herein. It is appreciated that computer system 100 of FIG. 1 is only an example and that embodiments as described herein can operate on or within a number of different computer systems including, but not limited to, general purpose networked computer systems, embedded computer systems, routers, switches, server devices, client devices, various intermediate devices/nodes, stand alone computer systems, media centers, handheld computer systems, multi-media devices, virtual machines, virtualization management servers, and the like. Computer system 100 of FIG. 1 is well adapted to having peripheral tangible computer-readable storage media 102 such as, for example, an electronic flash memory data storage device, a floppy disc, a compact disc, digital versatile disc, other disc based storage, universal serial bus "thumb" drive, removable memory card, and the like coupled thereto. The tangible computer-readable storage media is non-transitory in nature.

System 100 of FIG. 1 includes an address/data bus 104 for communicating information, and a processor 106A coupled with bus 104 for processing information and instructions. As depicted in FIG. 1, system 100 is also well suited to a multi-processor environment in which a plurality of processors 106A, 106B, and 106C are present. Conversely, system 100 is also well suited to having a single processor such as, for example, processor 106A. Processors 106A, 106B, and 106C may be any of various types of microprocessors. System 100 also includes data storage features such as a computer usable volatile memory 108, e.g., random access memory (RAM), coupled with bus 104 for storing information and instructions for processors 106A, 106B, and 106C. System 100 also includes computer usable non-volatile memory 110, e.g., read only memory (ROM), coupled with bus 104 for storing static information and instructions for processors 106A, 106B, and 106C. Also present in system 100 is a data storage unit 112 (e.g., a magnetic or optical disc and disc drive) coupled with bus 104 for storing information and instructions. System 100 also includes an alphanumeric input device 114 including alphanumeric and function keys coupled with bus 104 for communicating information and command selections to processor 106A or processors 106A, 106B, and 106C. System 100 also includes an cursor control device 116 coupled with bus 104 for communicating user input information and command selections to processor 106A or processors 106A, 106B, and 106C. In one embodiment, system 100 also includes a display device 118 coupled with bus 104 for displaying information.

Referring still to FIG. 1, display device 118 of FIG. 1 may be a liquid crystal device (LCD), light emitting diode display (LED) device, cathode ray tube (CRT), plasma display device, a touch screen device, or other display device suitable for creating graphic images and alphanumeric characters recognizable to a user. Cursor control device 116 allows the computer user to dynamically signal the movement of a visible symbol (cursor) on a display screen of display device 118 and indicate user selections of selectable items displayed on display device 118. Many implementations of cursor control device 116 are known in the art including a trackball, mouse, touch pad, touch screen, joystick or special keys on alphanumeric input device 114 capable of signaling movement of a given direction or manner of displacement. Alternatively, it will be appreciated that a cursor can be directed and/or activated via input from alphanumeric input device 114 using special keys and key sequence commands. System 100 is also well suited to having a cursor directed by other means such as, for example, voice commands. In various embodiments, alphanumeric input device 114, cursor control device 116, and display device 118, or any combination thereof (e.g., user interface selection devices), may collectively operate to provide a graphical user interface (GUI) 130 under the direction of a processor (e.g., processor 106A or processors 106A, 106B, and 106C). GUI 130 allows user to interact with system 100 through graphical representations presented on display device 118 by interacting with alphanumeric input device 114 and/or cursor control device 116.

System 100 also includes an I/O device 120 for coupling system 100 with external entities. For example, in one embodiment, I/O device 120 is a modem for enabling wired or wireless communications between system 100 and an external network such as, but not limited to, the Internet.

Referring still to FIG. 1, various other components are depicted for system 100. Specifically, when present, an operating system 122, applications 124, modules 126, and data 128 are shown as typically residing in one or some combination of computer usable volatile memory 108 (e.g., RAM), computer usable non-volatile memory 110 (e.g., ROM), and data storage unit 112. In some embodiments, all or portions of various embodiments described herein are stored, for example, as an application 124 and/or module 126 in memory locations within RAM 108, computer-readable storage media within data storage unit 112, peripheral computer-readable storage media 102, and/or other tangible computer-readable storage media.

Example Computing Environment

Example embodiments described herein provide a graphical user interface and a method for automating script creation for a log file using a graphical user interface. The described embodiments provide for accessing log data (e.g., log files) for software components and display the log data in the graphical user interface. As will be described, it should be appreciated that that the software components and the log analytics management software, might be distributed over a network.

One or more embodiments disclosed herein provide methods, systems, and computer programs for displaying and analyzing log data for a computing infrastructure. In one embodiment, log data, sometimes referred to as runtime logs, error logs, debugging logs, event data, is displayed in a graphical user interface. A log analytics application may parse each entry of the log data to extract several statically-defined, pre-determined fields, such as a timestamp. However, due to the unstructured format of log data, there may be information within log data that a user, such as a system administrator, may wish to identify and extract from the log data for additional analysis. According to one embodiment, the user may select text, via user input, from the log data for filtering the log data based on the selected text.

Figure 2:
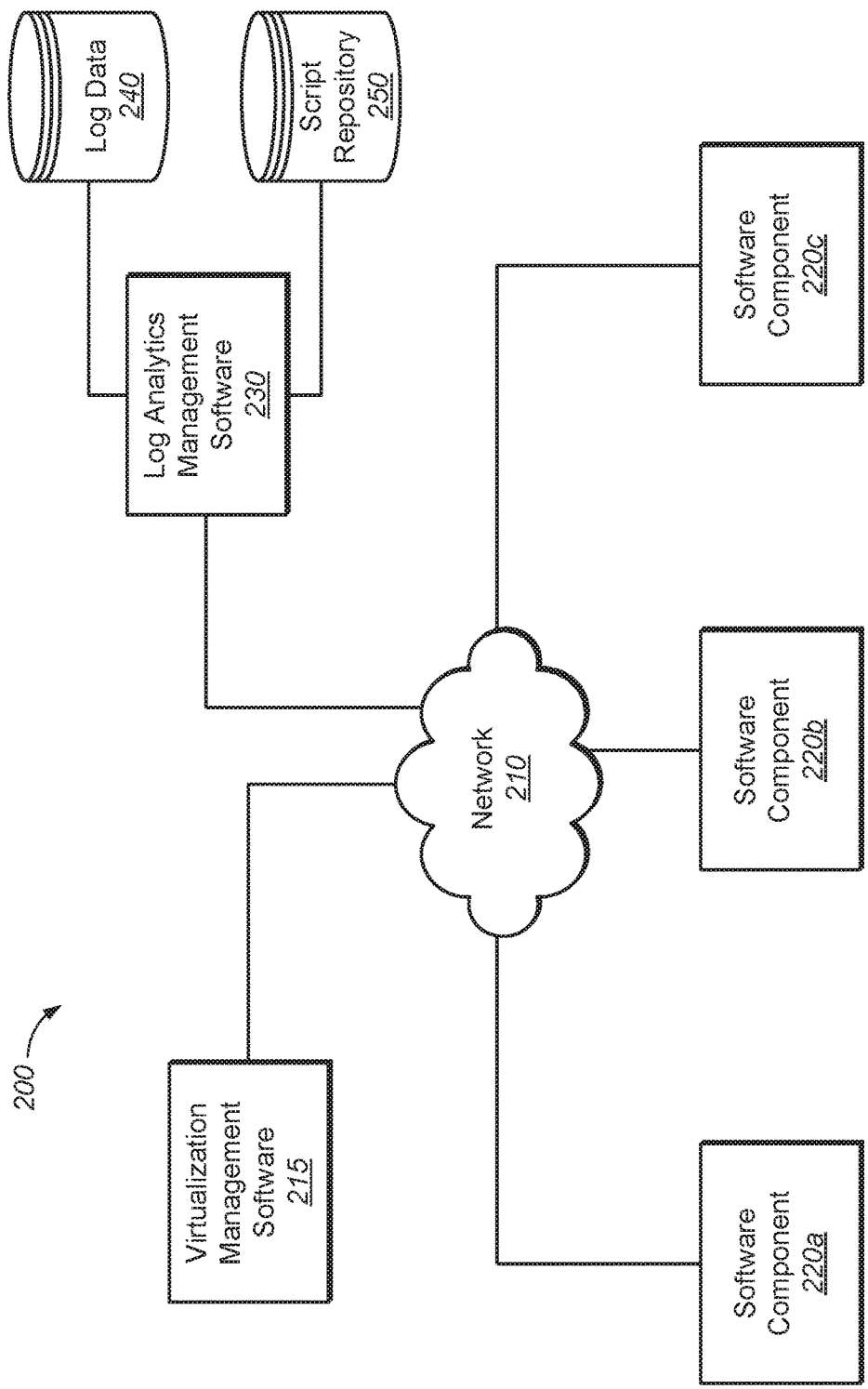
FIG. 2 illustrates an example computing environment upon which embodiments described herein may be implemented.

FIG. 2 is a block diagram that illustrates an example computing environment 200 upon which embodiments described herein may be implemented. As illustrated, computing environment 200 includes a plurality of software components, identified as software components 220a, 220b and 220c, and referred to collectively as software components 220. It should be appreciated that it each software component 220 is operating on a computer system (e.g., computer system 100 of FIG. 1), and is communicatively coupled to network 210. In various embodiments, the software components 220 are correlated such that the operations of the software components 220 are interrelated (e.g., dependent on each other). For example, in one embodiment, software component 220a is VMware Horizon View, software component 220b is VMware vCenter™, and software component 220c is an ESX host.

As mentioned earlier, software and infrastructure components of computing environment 200, including software components 220, may generate log data during operation. Log data may indicate the state, and state transitions, that occur during operation, and may record occurrences of failures, as well as unexpected and undesirable events. In one embodiment, log data may be unstructured text comprised of a plurality of log messages, including status updates, error messages, stack traces, and debugging messages. With many different processes running in a complex computing environment, a large volume of heterogeneous log data, having varying syntax, structure, and even language, may be generated. While some information from log data may be parsed out according to pre-determined fields, such as time stamps, other information in the log messages may be relevant to the context of a particular issue, such as when troubleshooting or proactively identifying issues occurring in the computing environment 200. It should be appreciated that embodiments described herein may refer to any component generating log data, such as operating systems and/or applications, and is not limited herein to software components 220.

Embodiments described herein also include a log analytics management software 230 configured to store and analyze log data 240 received from software and infrastructure components of computing environment 200. According to some embodiments, users, such as system administrators, can access log analytics management software 230 to access, process, and analyze log data 240 in an interactive visualization via the graphical user interface. The graphical user interface may be configured to enable the user to select text from log data 240 to dynamically filter the log data for a software component 220, allowing the user to search for desired portions of the log data.

In the embodiment shown in FIG. 2, computing environment 200 includes virtualization management software 215 that may communicate to software components 220. Virtualization management software 215 is configured to carry out administrative tasks for the computing environment 200, including managing hosts of a software component 220, managing virtual machines (VMs) running within each host, provisioning VMs, migrating VMs from one host to another host, and load balancing between hosts. In one embodiment, virtualization management software 215 is a computer program that resides and executes in a central server, which may reside in computing environment 200, or alternatively, running as a VM of a host of a software component 220. One example of a virtualization management software is the vCenter™ Server product made available from VMware, Inc. Similar to the software and infrastructure components of computing environment 200, other components of computing environment 200, including, host group(s), hosts, VMs running on hosts, guest operating systems, applications, and processes running within VMs, may generate large amounts of log data during operation.

While log analytics management software 230 is depicted in FIG. 2 as a separate component that resides and executes on a separate server or virtual machine, it is appreciated that log analytics management software 230 may alternatively reside in any one of the computing devices of the virtualized computing environment 200. In one embodiment, log analytics management software 230 may be embodied as a plug-in component configured to extend functionality of virtualization management software 215. Access to the log analytics management software 230 can be achieved via a client application (not shown). For example, each analysis task, such as searching for log messages, filtering for log messages, analyzing log messages over a period of time, can be accomplished through the client application. One embodiment provides a stand-alone application version of the client application. In another embodiment, the client application is implemented as a web browser application that provides management access from any networked device.

In one embodiment, log analytics management software 230 may be configured to access log files for software components, and display the log files in a graphical user interface for analysis by a user. In various embodiments, a user may select a string within a log file and perform an operation on that string. The log analytics management software 230 can then automatically create a script based on the operation and any input received (if relevant to the selected operation). In some embodiments, as will be described, log analytics management software 230 may be configured to automatically create scripts based on user actions, and store those scripts in script repository 250 for later retrieval and use.

In accordance with various embodiments, many different types of operations can be performed on the log file, resulting in automatic creation of a script. In one embodiment, the operation is a search operation based on a selected string. The graphical user interface filters the log file according to the string such that only lines of the log file including the string are displayed. For example, the search operation assists a user in searching and identifying selected terms identified by the string. A script for the search operation is created and stored for future use. An example search operation is described in FIGS. 4C through 4E.

In another embodiment, the operation is a variable setting operation (also referred to as a set as variable operation), where a string is selected within the log file and the variable setting operation is performed using the string. In one embodiment, the user is prompted with a dialogue box for inputting a label for the variable. In one embodiment, the variable setting operation is performed subsequent a search operation, such that the string associated with the search operation defines a static search pattern, and wherein the string associated with the variable setting operation defines a variable associated with the static search pattern. A script for the variable setting operation is created and stored for future use. An example variable setting operation is described in FIGS. 4F through 4H.

In another embodiment, the operation is a search with variable operation. In one embodiment, a user is prompted to select a variable from available variables (e.g., a variable defined in a variable setting operation). The search with variable operation is performed on a log file. In one embodiment, the log file is the log file upon which the variable setting operation was performed. In another embodiment, the log file is another log file for another component. The graphical user interface filters the log file according to the variable such that only lines of the log file including the variable are displayed. For example, the search with variable operation assists a user in searching and identifying variable terms (e.g., IDs, MAC addresses, IP addresses, etc.) A script for the search with variable operation is created and stored for future use. An example search operation is described in FIGS. 4I through 4K.

Log analytics management software 230 may access log files from log data 240, and display any number of log files within a graphical user interface. Examples of graphical user interfaces of log analytics management software 230 are shown in FIGS. 3A and 3B.

Example Graphical User Interface and for Automating Script Creation for a Log File Example embodiments described herein provide a method for connecting a local virtualization infrastructure to a cloud-based virtualization infrastructure using a graphical user interface. FIGS. 3A and 3B illustrate example graphical user interfaces 300 and 350 for automating script creation for a log file, in accordance with various embodiments. It should be appreciated that graphical user interfaces 300 and 350 are associated with log analytics management software (e.g., log analytics management software 230 of FIG. 2), and provide an interactive visualization of log data (e.g., log files).

It should be appreciated that graphical using interfaces may be designed to provide a particular interactive experience based on the type of information presented and/or received through the graphical using interface. Moreover, a graphical using interface may include one or more different type of interactive elements for receiving information. For example, the interactive elements may include, without limitation: buttons, widgets, controls, text boxes, radio buttons, tri-state boxes, list boxes, numerical input boxes, tool bars, sliders, spinners, drop-down lists, accordion lists, menus, menu bars, tool bars, icons, scroll bars, labels, tooltips, balloon help, status bars, progress bars, etc. The types of interactive elements included in a graphical using interface are typically design decisions, where a graphical using interface designer might attempt to provide particular elements to present and/or receive particular types of information. For example, a simple graphical using interface may include a drop-down list, where a user would select an item from the drop down list.

Figure 3A:
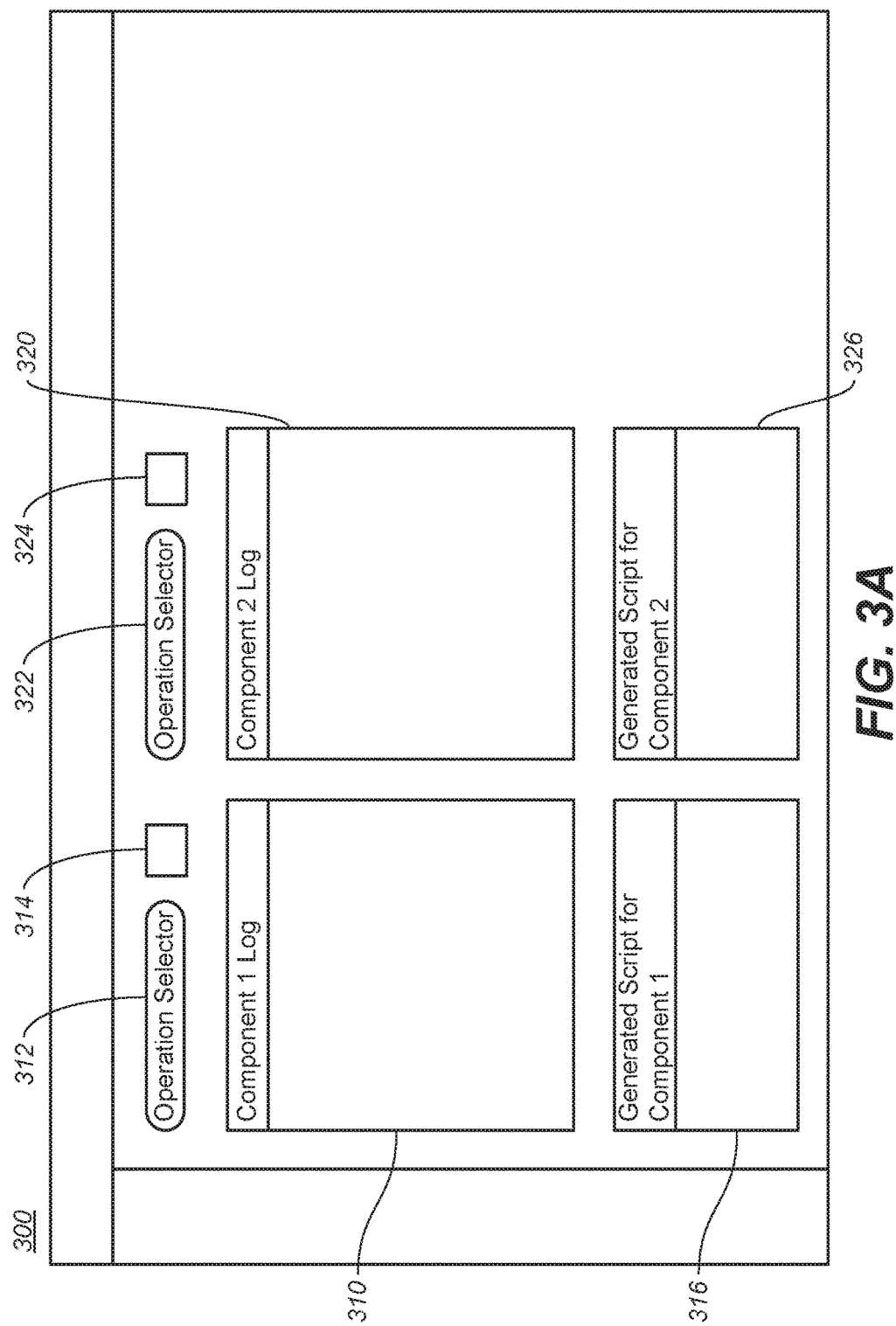
FIGS. 3A and 3B illustrate example graphical using interfaces for displaying log files simultaneously, in accordance with various embodiments.
Figure 3B:
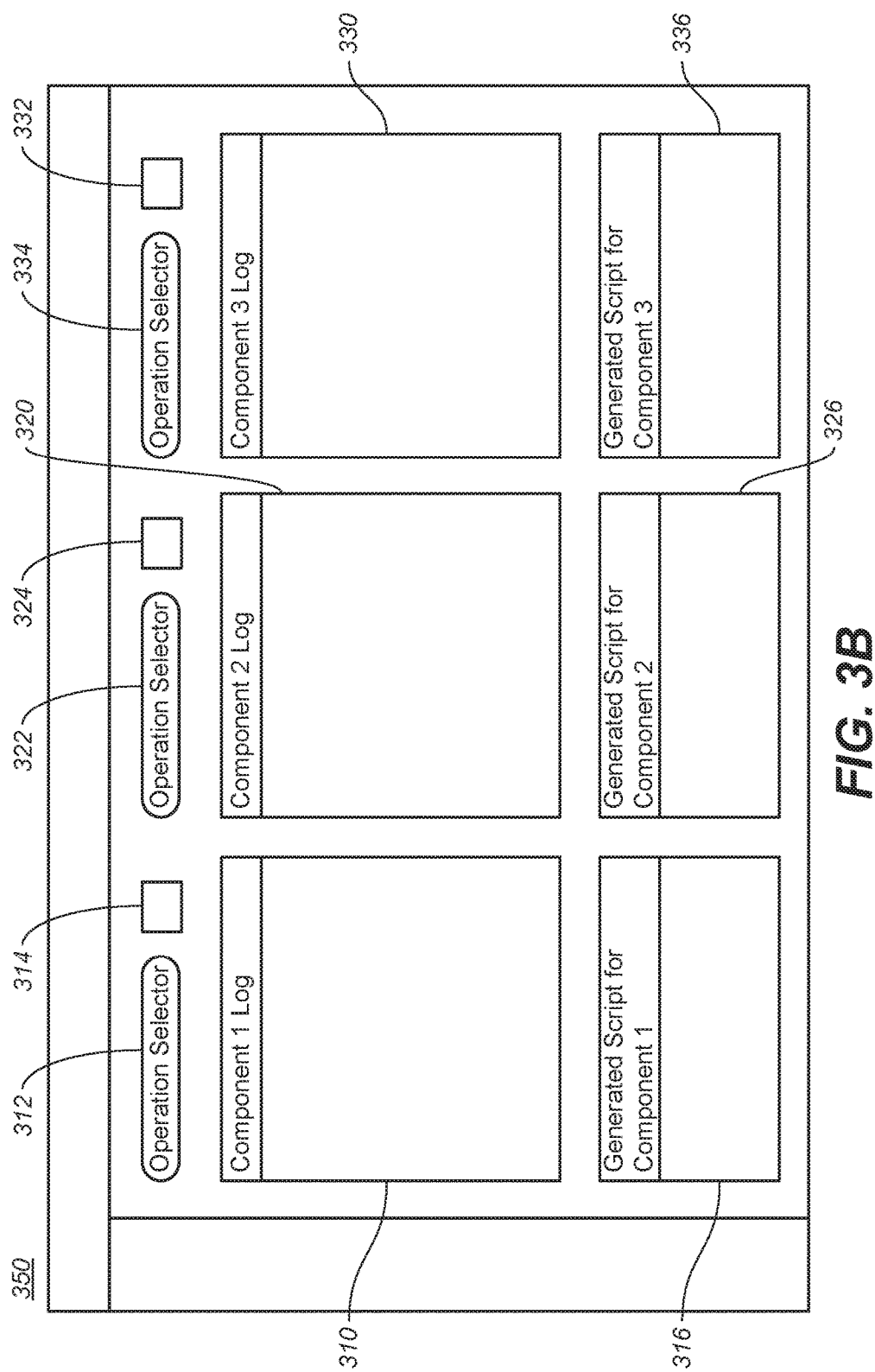

FIG. 3A illustrates an example graphical using interface 300 for displaying two log files simultaneously, in accordance with an embodiment. For instance, log file viewer 310 is for displaying a log file for a first component and log file viewer 320 is for displaying a log file for a second component. In one embodiment, the first component and the second component are correlated. Log file viewers 310 and 320 display text from the respective log files. In various embodiments, the text is selectable (e.g., by a user interacting with a cursor control device, such as a mouse) such that a string of text of the log file may be selected. In various embodiments, the selected string is highlighted or otherwise emphasized to visually indicate the selection.

Graphical user interface 300 also includes operation selector 312 associated with log file viewer 310 and operation selector 322 associated with log file viewer 320. Operation selectors 312 and 322 provide a user with the ability to select an operation to perform on the respective log file, e.g., using the selected string of the log file. In one embodiment, operation selectors 312 and 322 are drop-down lists of available operations. However, it should be appreciated that other types of interactive elements, such as those described above, may be used. In one embodiment, an operation is performed responsive to receiving a selection of the operation from the respective operation selector.

In accordance with the described embodiments, operation selectors 312 and 322 provide an interactive element for receiving a selection of an operation to perform on the respective log file. In one embodiment, the operations available for selection include, without limitation: a search operation, a variable setting operation, and a search with variable operation. It should be appreciated that other types of operations for use with analyzing log files may also be available for selection.

In one embodiment, graphical user interface 300 also includes operation activator 314 associated with operation selector 312 and operation activator 324 associated with operation selector 322. In the present embodiment, an operation is performed after receiving a selection of the operation from the respective operation selector and receiving an interaction with the respective operation activator. For example, a selection of a string may be received and a selection of an operation may be received in any order. In another example, where an operation does not require a selection of a string, a selection of an operation may be received. The operation is then performed responsive to receiving an interaction with the respective operation activator.

Embodiments described herein automatically create a script based on the operation and any string selection (where a string selection is required). In various embodiments, as illustrated, graphical user interface 300 also includes script viewer 316 associated with log file viewer 310 and script viewer 326 associated with log file viewer 320 for displaying the respective generated scripts. It should be appreciated that script viewers 316 and 326 are optional.

FIG. 3B illustrates an example graphical using interface 350 for displaying three log files simultaneously, in accordance with an embodiment. For instance, log file viewer 310 is for displaying a log file for a first component, log file viewer 320 is for displaying a log file for a second component, and log file viewer 330 is for displaying a log file for a third component. Log file viewer 330 operates in a similar manner as log file viewers 310 and 320, as described above.

Graphical user interface 350 also includes operation selector 312 associated with log file viewer 310, operation selector 322 associated with log file viewer 320, and operation selector 332 associated with log file viewer 330, where operation selector 332 operates in a similar manner as operation selectors 312 and 322, as described above. In one embodiment, graphical user interface 300 also includes operation activator 314 associated with operation selector 312, operation activator 324 associated with operation selector 322, and operation activator 334 associated with operation selector 332, where operation activator 334 operates in a similar manner as operation activators 314 and 324, as described above.

Embodiments described herein automatically create a script based on the operation and any string selection (where a string selection is required). In various embodiments, as illustrated, graphical user interface 350 also includes script viewer 316 associated with log file viewer 310, script viewer 326 associated with log file viewer 320, and script viewer 336 associated with log file viewer 330 for displaying the respective generated scripts. It should be appreciated that script viewers 316, 326 and 336 are optional.

While FIGS. 3A and 3B illustrate example graphical user interfaces 300 and 350 for displaying two and three log files, respectively, it should be appreciated that embodiments anticipated herein may include graphical user interfaces for displaying any number of log files.

Figure 4A:
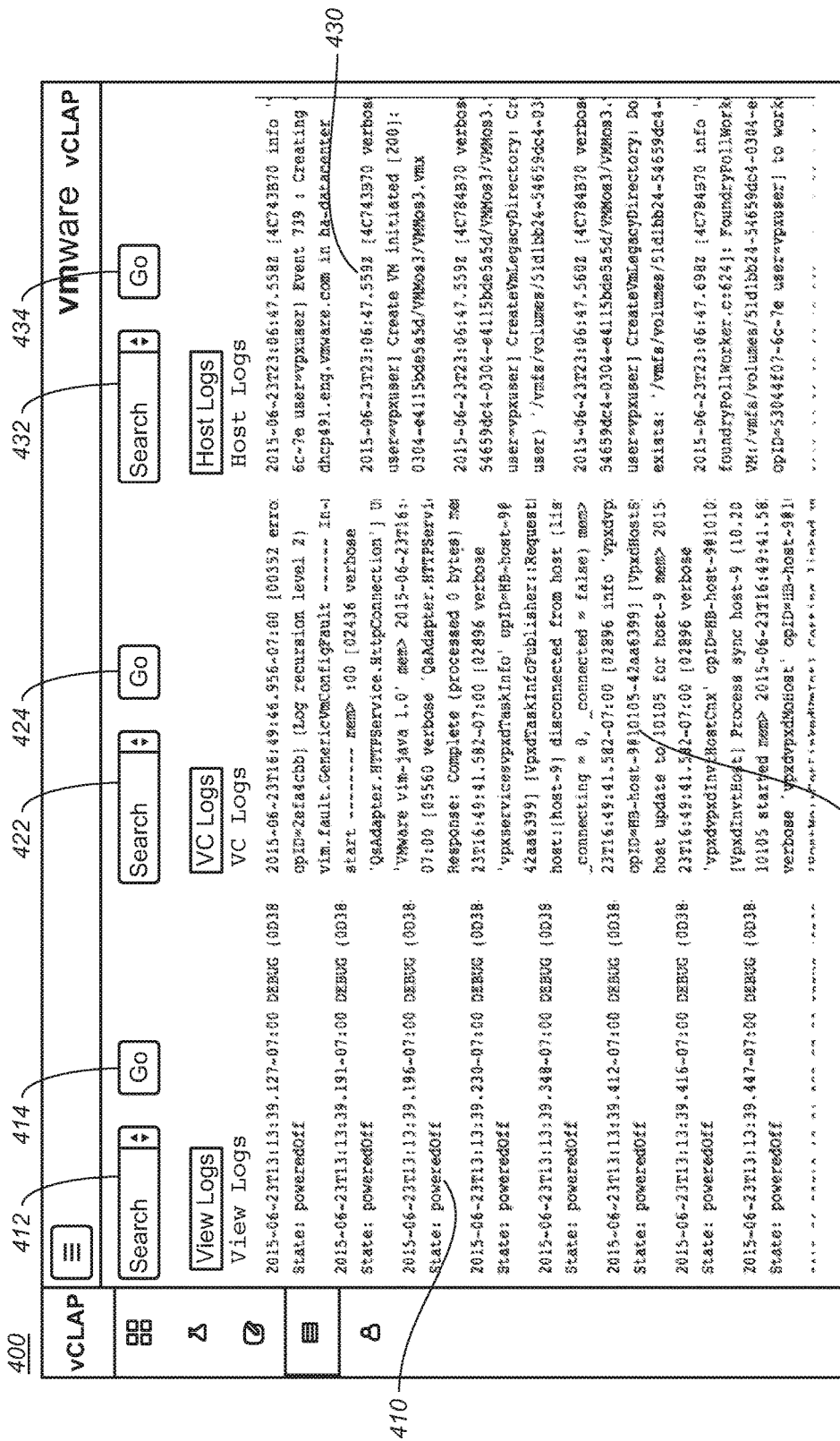

FIGS. 4A-K illustrates screenshots of example graphical user interface 400 for automating script creation for log files, in accordance with various embodiments. FIG. 4A illustrates a screenshot of graphical user interface 400 including log file viewer 410 for viewing a log file for a first component, log file viewer 420 for viewing a log file for a second component, and log file viewer 430 for viewing a log file for a third component. Graphical user interface 400 also includes operation selector 412 and operation activator 414 associated with log file viewer 410, operation selector 422 and operation activator 424 associated with log file viewer 420, and operation selector 432 and operation activator 434 associated with log file viewer 430.

Figure 4B:
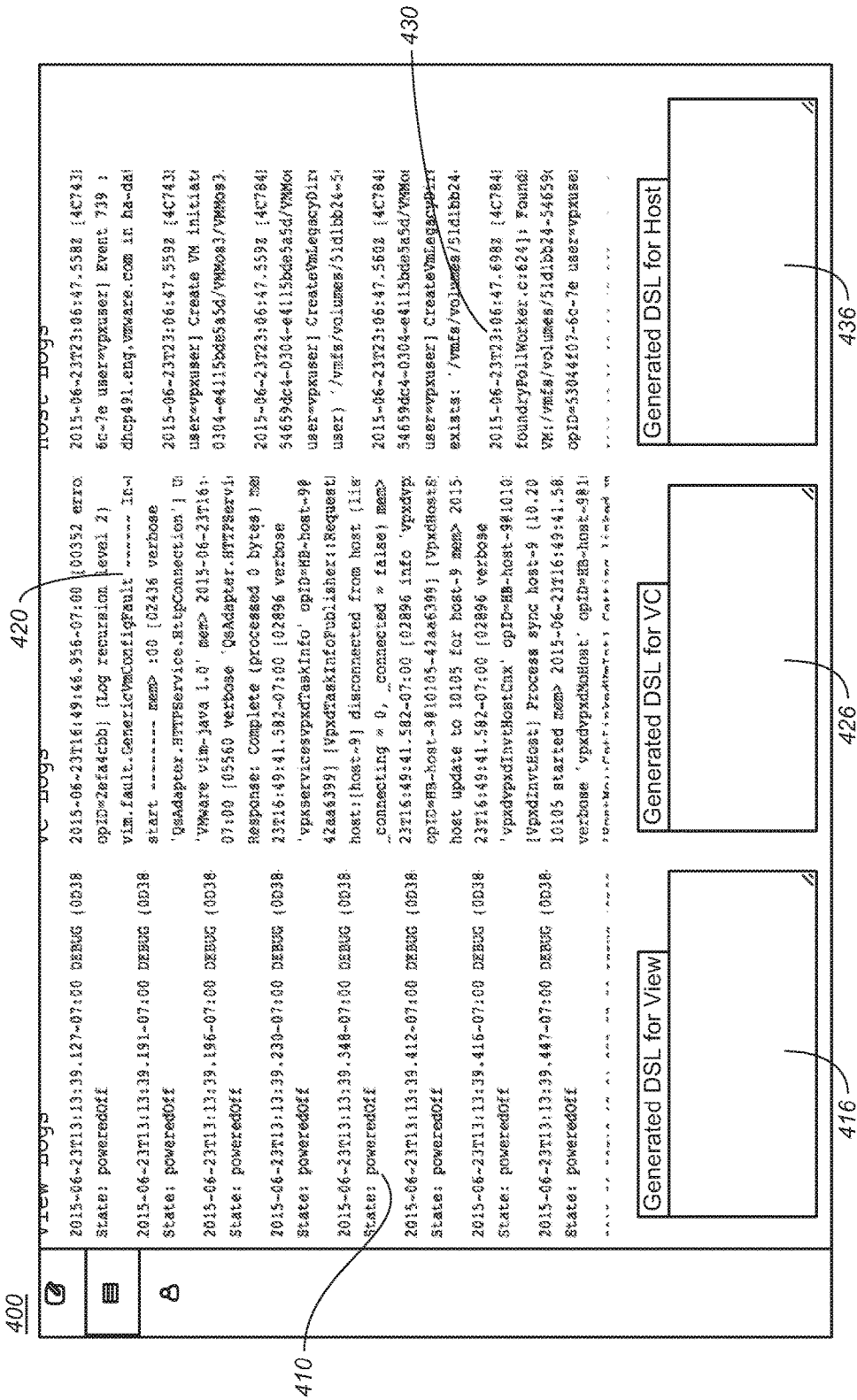

FIG. 4B illustrates a screen shot of graphical user interface 400 including script viewer 416 associated with log file viewer 410, script viewer 426 associated with log file viewer 420, and script viewer 436 associated with log file viewer 430. As illustrated, the screenshot of FIG. 4B is a lower portion of the screenshot of FIG. 4A, scrolled down to view the complete graphical user interface 400.

Figure 4C:
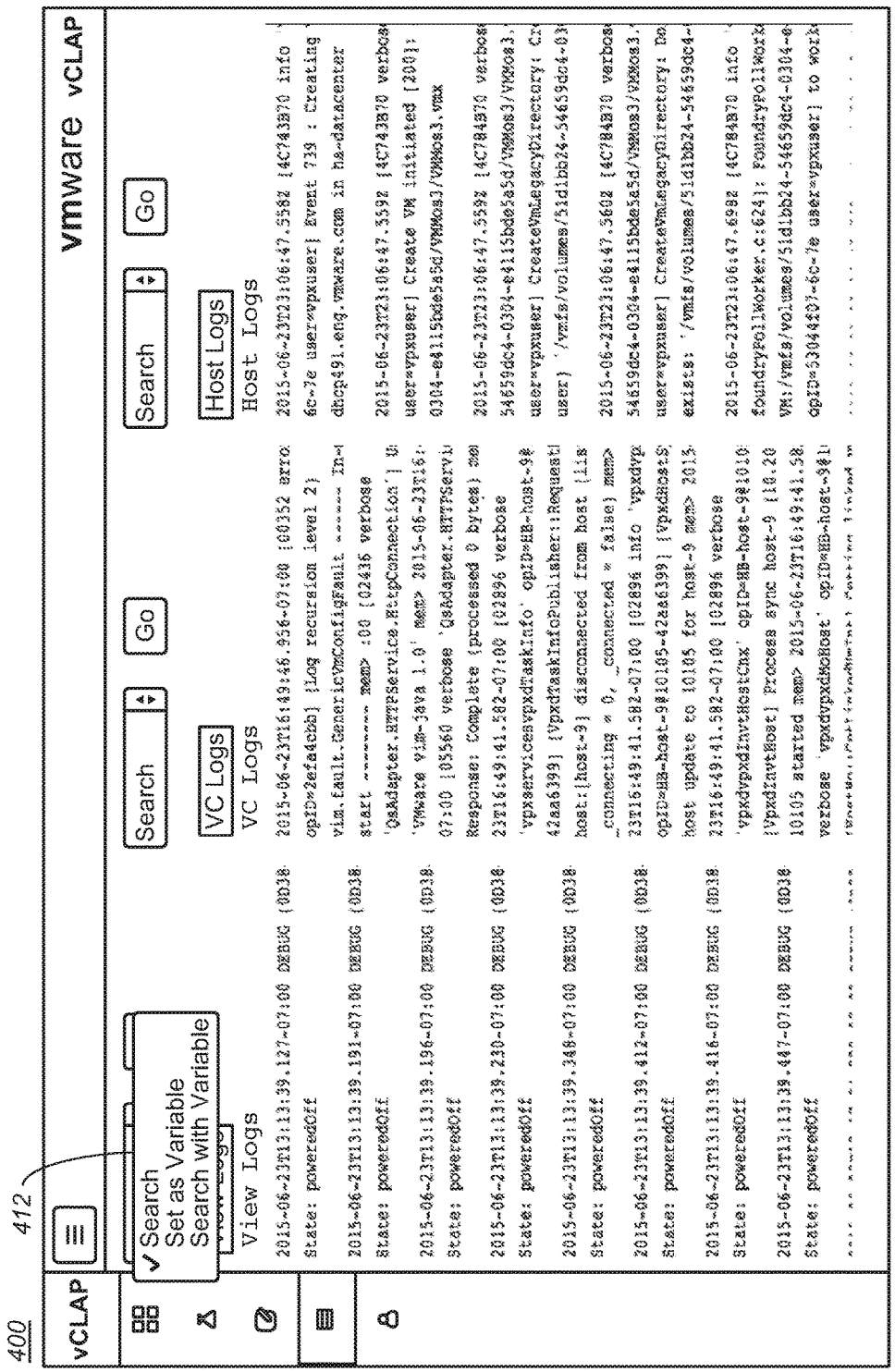
Figure 4D:
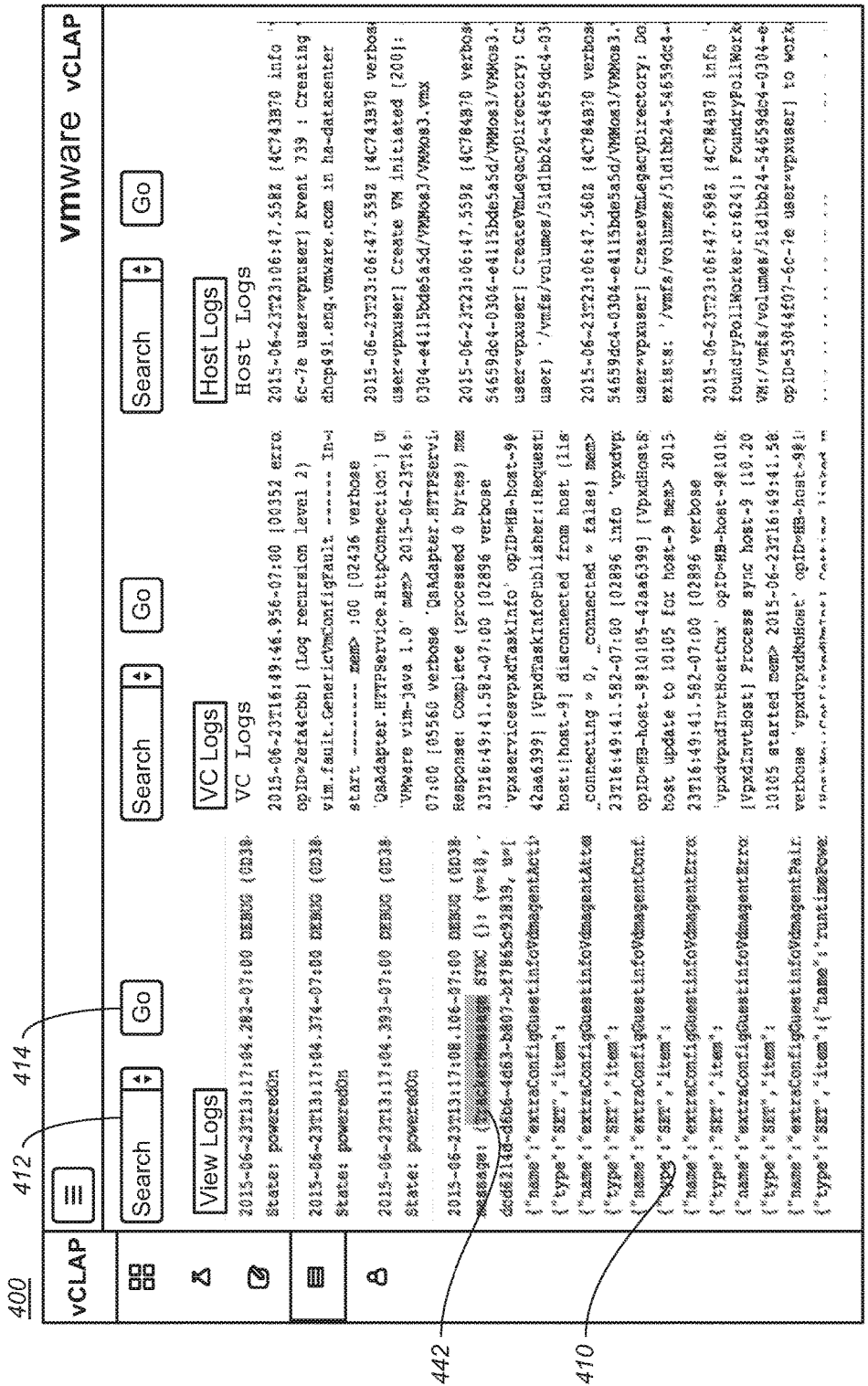
Figure 4E:
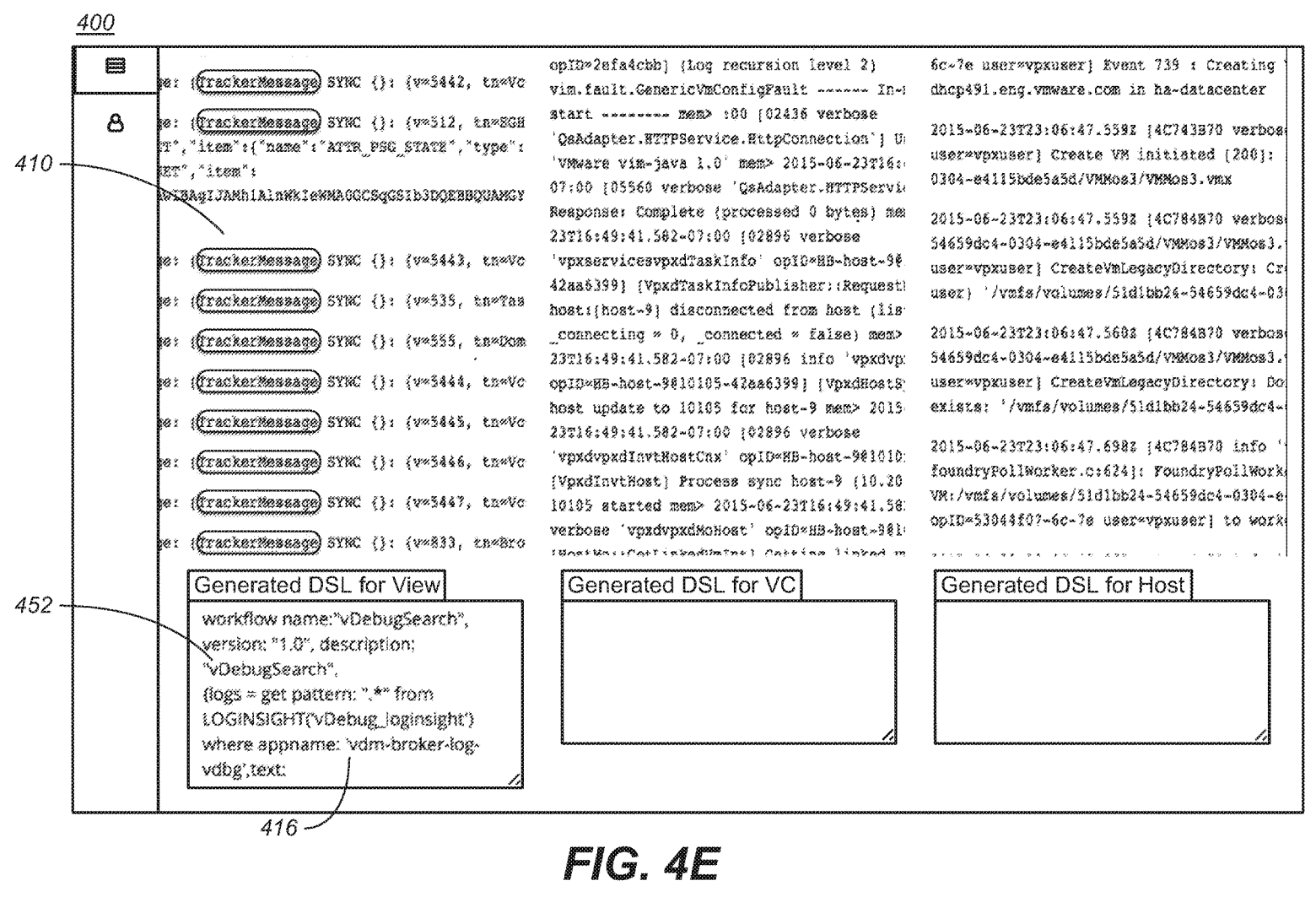

FIGS. 4C through 4E illustrate screenshots of an example search operation, in accordance with various embodiments. As shown in FIG. 4C, a user interaction with operation selector 412 is shown. In one embodiment, operation selector 412 includes a drop-down list including three available operations: a "Search" operation, a "Set as Variable" operation, and a "Search with Variable" operation. As shown in FIG. 4C, a selection of "Search" operation has been received, as indicated by the check mark next to "Search" operation.

As shown in FIG. 4D, a selection of a string 442 (e.g., the string "TrackerMessage" as shown) has been received within the log file of log file viewer 410. Operation selector 412 indicates that a "Search" operation is selected, and an interaction with operation activator 414 initiates performance of a search operation using the selected string 442.

As shown in FIG. 4E, the log file of log file viewer 410 has been filtered according to the string "TrackerMessage," such that only lines of the log file including the string "TrackerMessage" are shown. A script 452 is automatically generated for performing a search operation with the selected string. Script viewer 416 displays script 452. An example script 452 created and displayed in script viewer 416 is:

```
workflow name:"vDebugSearch",
version: "1.0", description:
"vDebugSearch",
{logs = get pattern: ".*" from
LOGINSIGHT('vDebug_loginsight')
where appname: 'vdm-broker-log-
vdbg',text:
[matches:~/TrackerMessage.*/]
logs.each { logLine ->
    save([logLine.originalText]) }
}
```

Figure 4F:
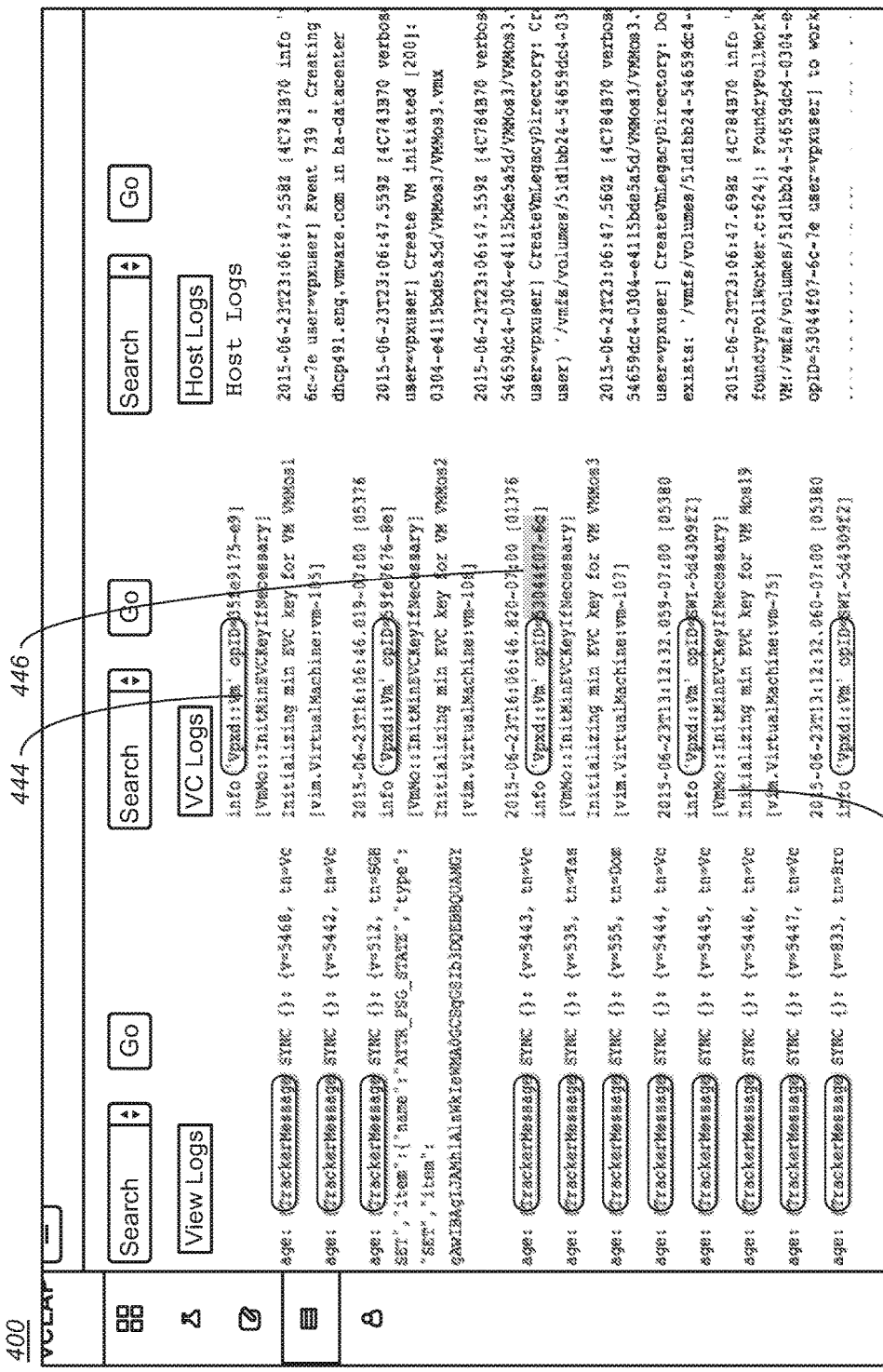
Figure 4G:
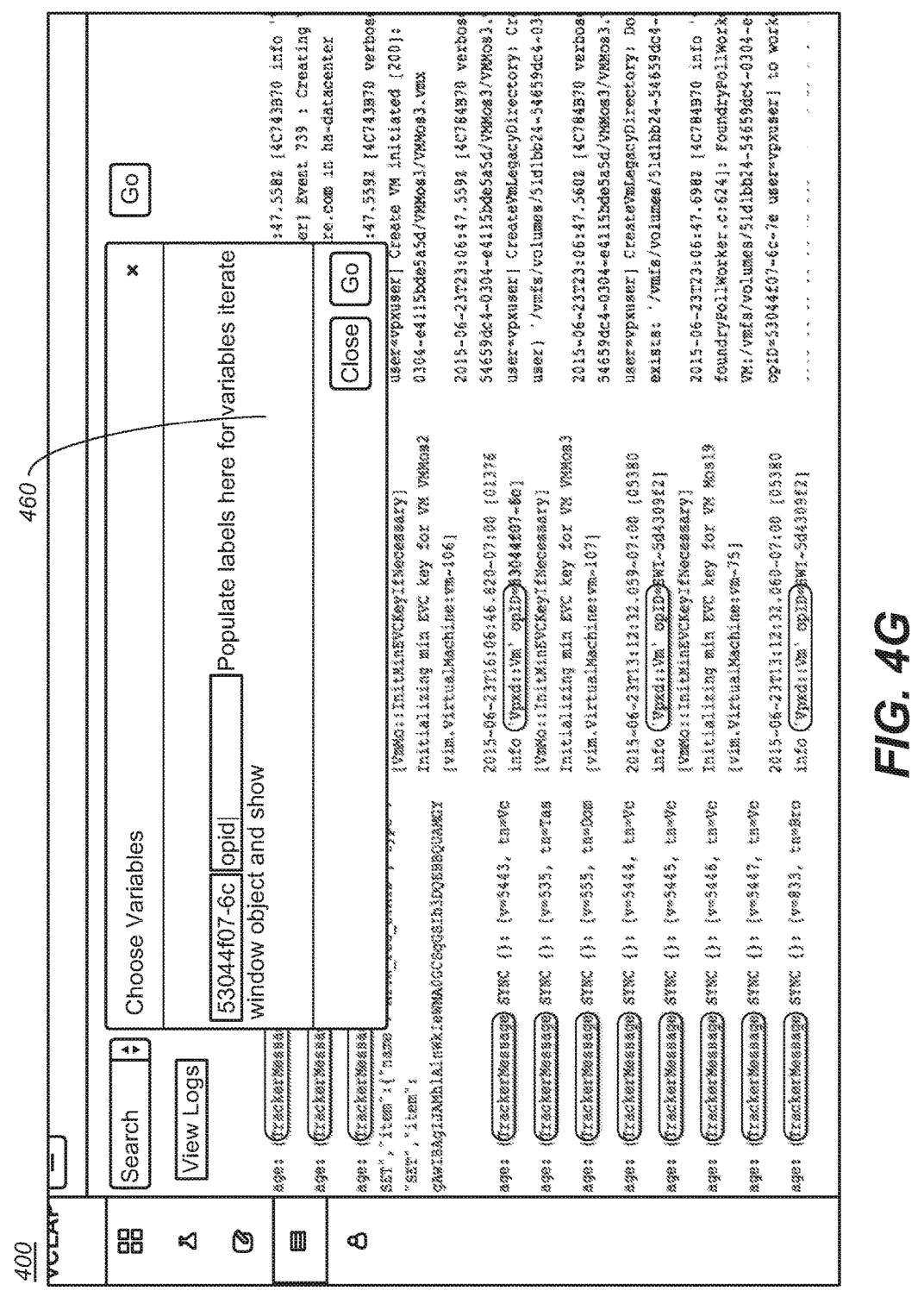
Figure 4H:
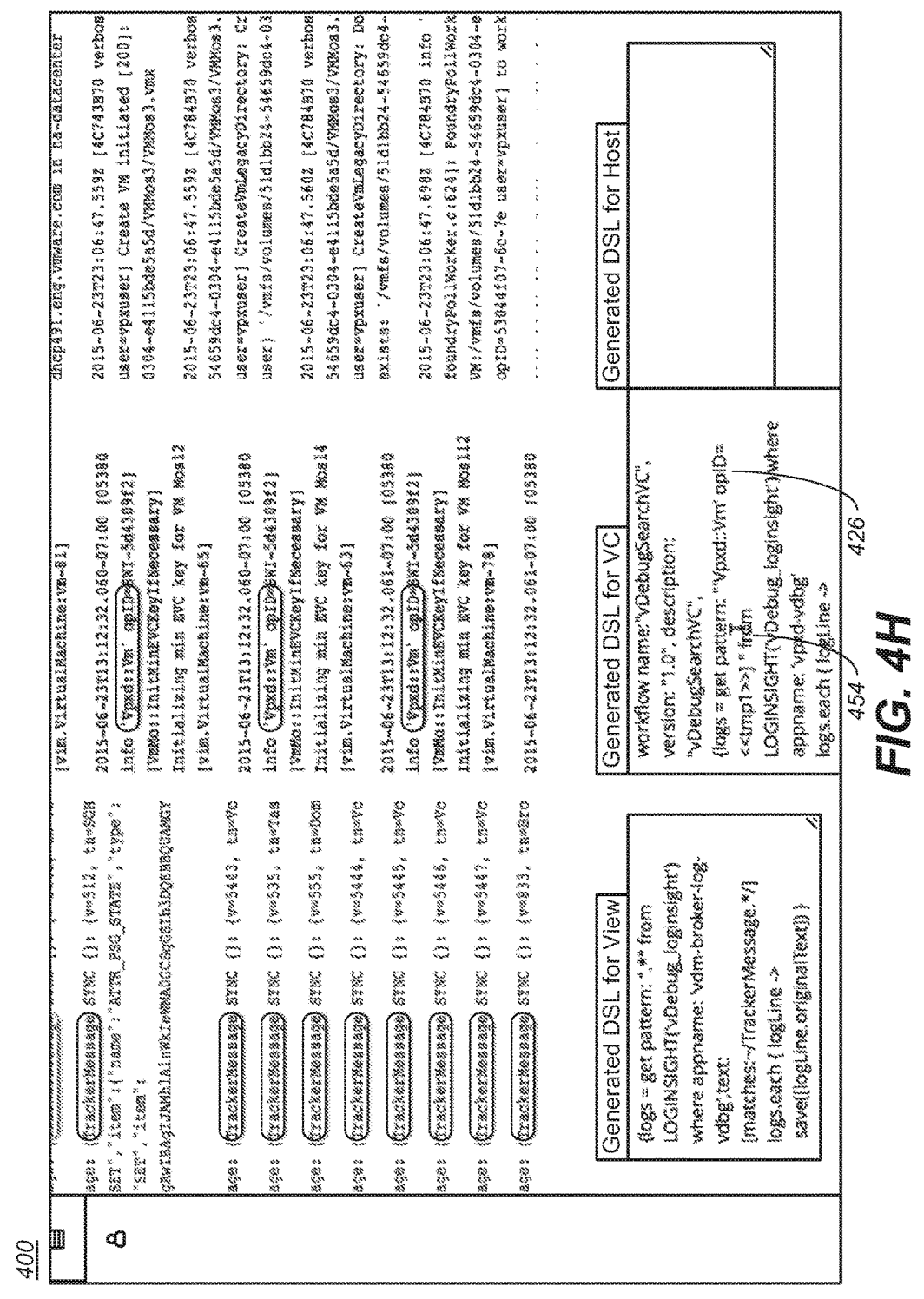

FIGS. 4F through 4H illustrate screenshots of an example variable setting operation, in accordance with various embodiments. As shown in FIG. 4F, a search operation for script 444 (e.g., the string "'Vpxd::Vm' opID=" has already been performed on the log file for the second component within log file viewer 420, such that only lines of the log file including the string "'Vpxd::Vm' opID=" are shown. A script was already generated according to this search operation. As shown in FIG. 4F, a selection of a string 446 (e.g., the string "53044f07-6c" as shown) has been received within the log file of log file viewer 420.

As shown in FIG. 4G, a user selection of a "Set as Variable" operation has previously been received and initiated (not shown). Responsive to the activating the "Set as Variable" operation, dialogue box 460 is displayed for receiving a label for the selected variable. As shown, the label "opid" is shown and given to the variable associated with string 446.

As shown in FIG. 4H, script 454 is automatically generated for performing a "Set as Variable" operation for the selected strings. Script viewer 426 displays script 454. An example script 454 created and displayed in script viewer 426 is:

```
workflow name:"vDebugSearchVC",
version: "1.0", description:
"vDebugSearch",
{logs = get pattern: "'Vpxd::Vm' opID=
<<tmp1>>] " from
LOGINSIGHT('vDebug_loginsight') where
appname: 'vpxd-vdbg',
logs.each { logLine ->
    opid = logLine.tmp1
    save([opid,logLine.originalText]) }
}
```

For example, script 454 performs a variable setting operation by search for the search pattern "'Vpxd::Vm' opID=" and identifying as an output the string that follows the search pattern up to the first bracket, where the variable is identified within the script as "<<tmp1>>". As a result, execution of the script on a log file (e.g., the log file for any component) would set the selected string as a variable.

Figure 4I:
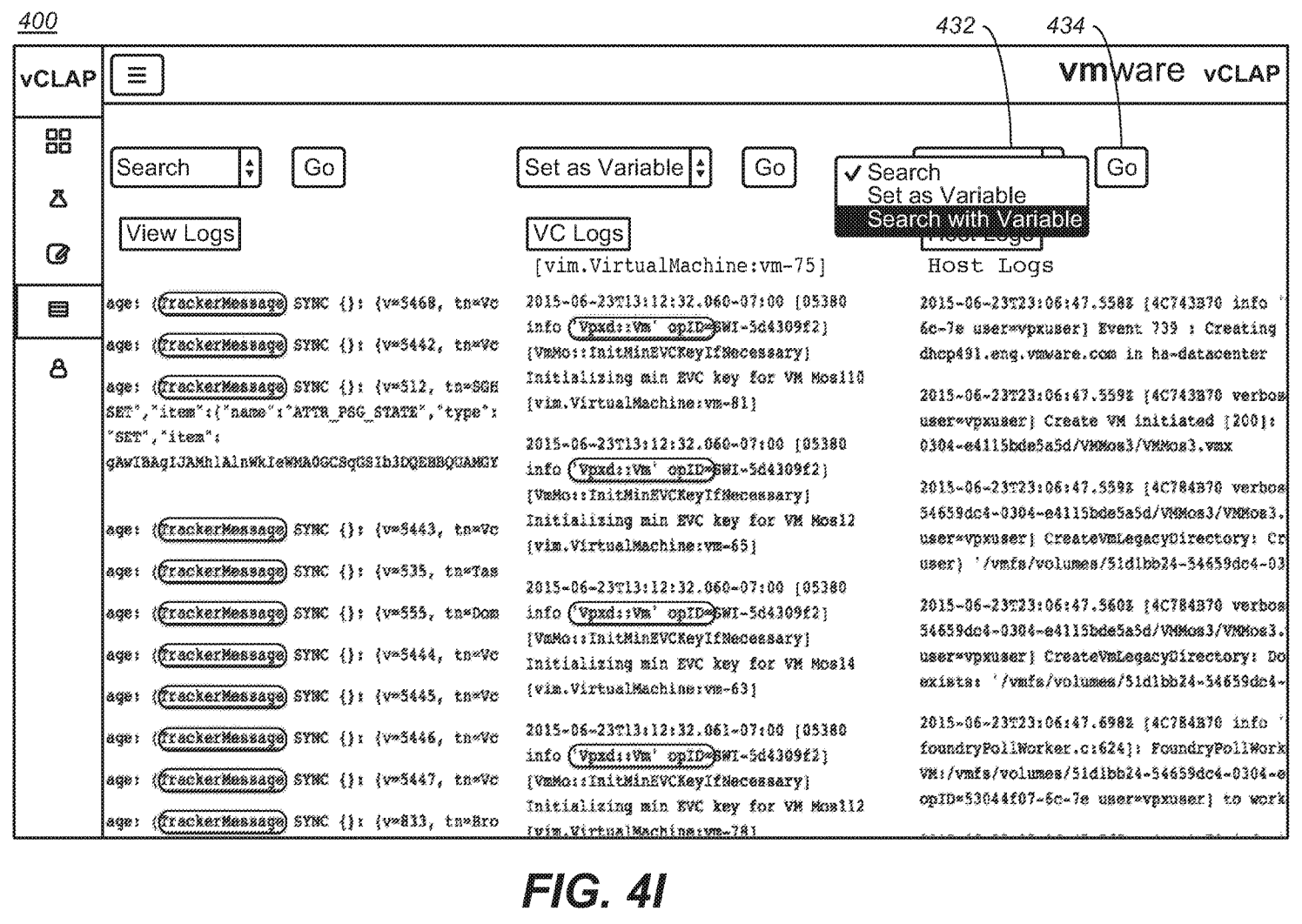
Figure 4J:
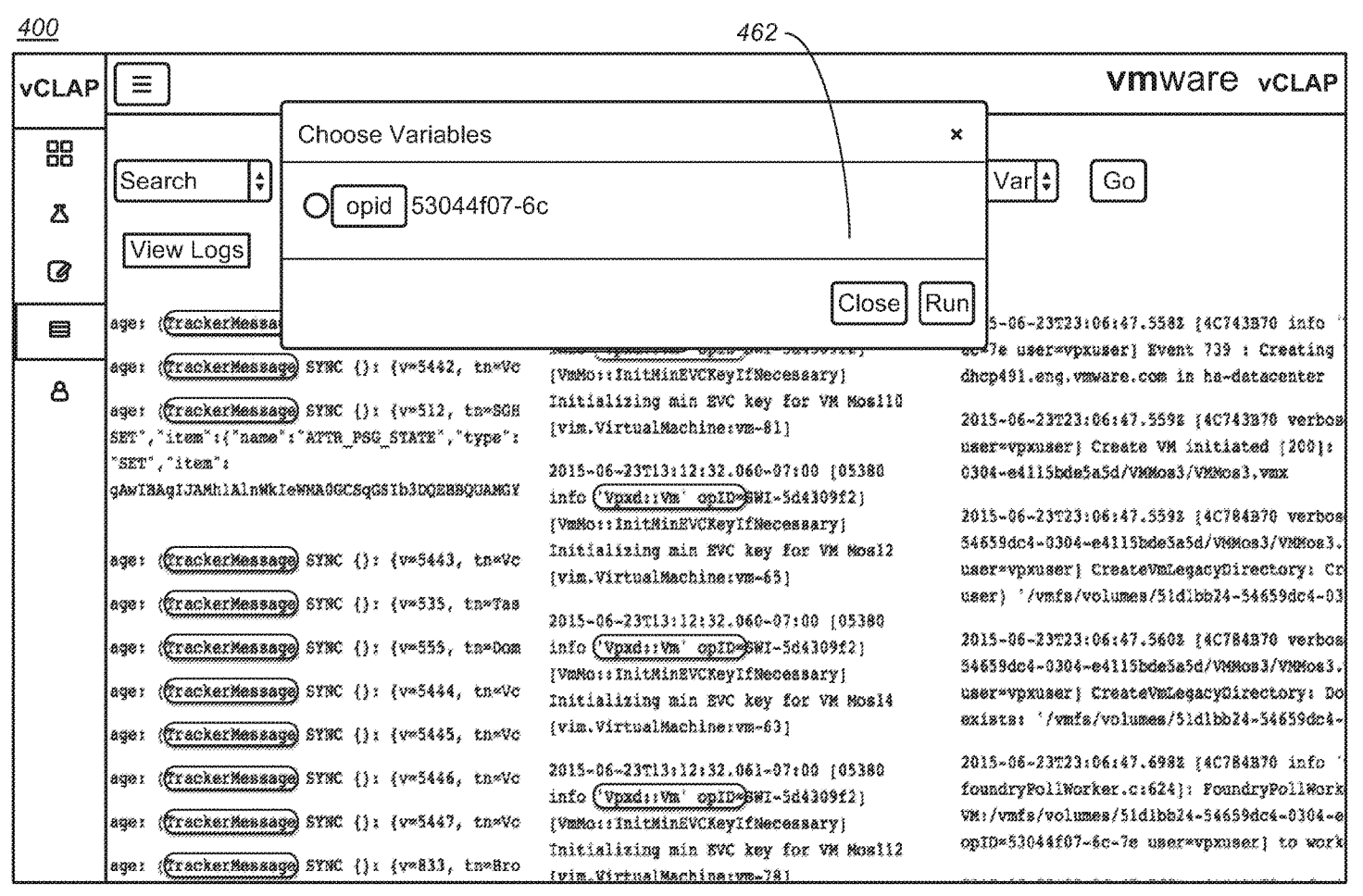
Figure 4K:
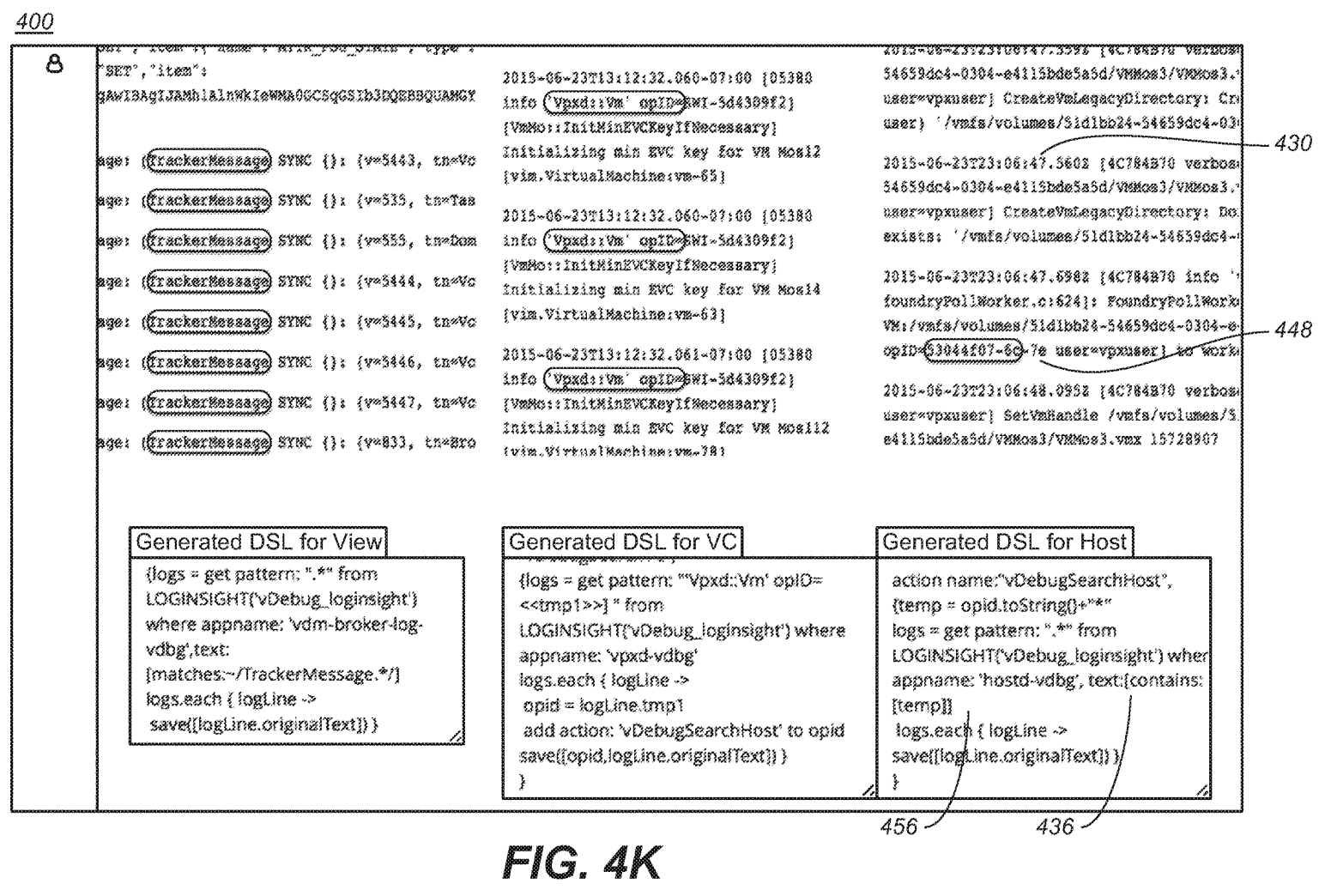

FIGS. 4I through 4K illustrate screenshots of an example "Search with Variable" operation, in accordance with various embodiments. As shown in FIG. 4I, a user interaction with operation selector 432 is shown. In one embodiment, operation selector 432 includes a drop-down list including three available operations: a "Search" operation, a "Set as Variable" operation, and a "Search with Variable" operation. As shown in FIG. 4I, a selection of "Search" operation has been selected, as indicated by the highlighting over "Search with Variable" operation.

As shown in FIG. 4J, responsive to the activating the "Search with Variable" operation, dialogue box 462 is displayed for receiving a selection of a variable. As shown, only one variable is available (the variable "opid" established above as described in FIGS. 4F through 4H.

As shown in FIG. 4K, responsive to the search with variable operation being performed with the "opid" variable selected, the log file within log file viewer 430 is filtered according to the "opid" variable. As shown, only lines of the log file including the string "'Vpxd::Vm' opID=" are shown, with the variable associated with the string 448 being highlighted. Script 456 is automatically generated for performing a "Search with Variable" operation. Script viewer 436 displays script 456. An example script 456 created and displayed in script viewer 436 is:

```
action name:"vDebugSearchHost",
{temp = opid.toString( )+"*"
logs = get pattern: ".*" from
LOGINSIGHT('vDebug_loginsight') where
appname: 'hostd-vdbg', text:[contains:
[temp]]
    logs.each { logLine ->
    save([logLine.originalText]) }
}
```

For example, script 456 performs a search with variable operation by searching for the search pattern "'Vpxd::Vm' opID=" and outputting the strings that follows the search pattern up to the first bracket. As a result, execution of the script on a log file (e.g., the log file for any component) would generate as an output a list of all values following the search pattern and preceding the bracket.

Figure 5A:
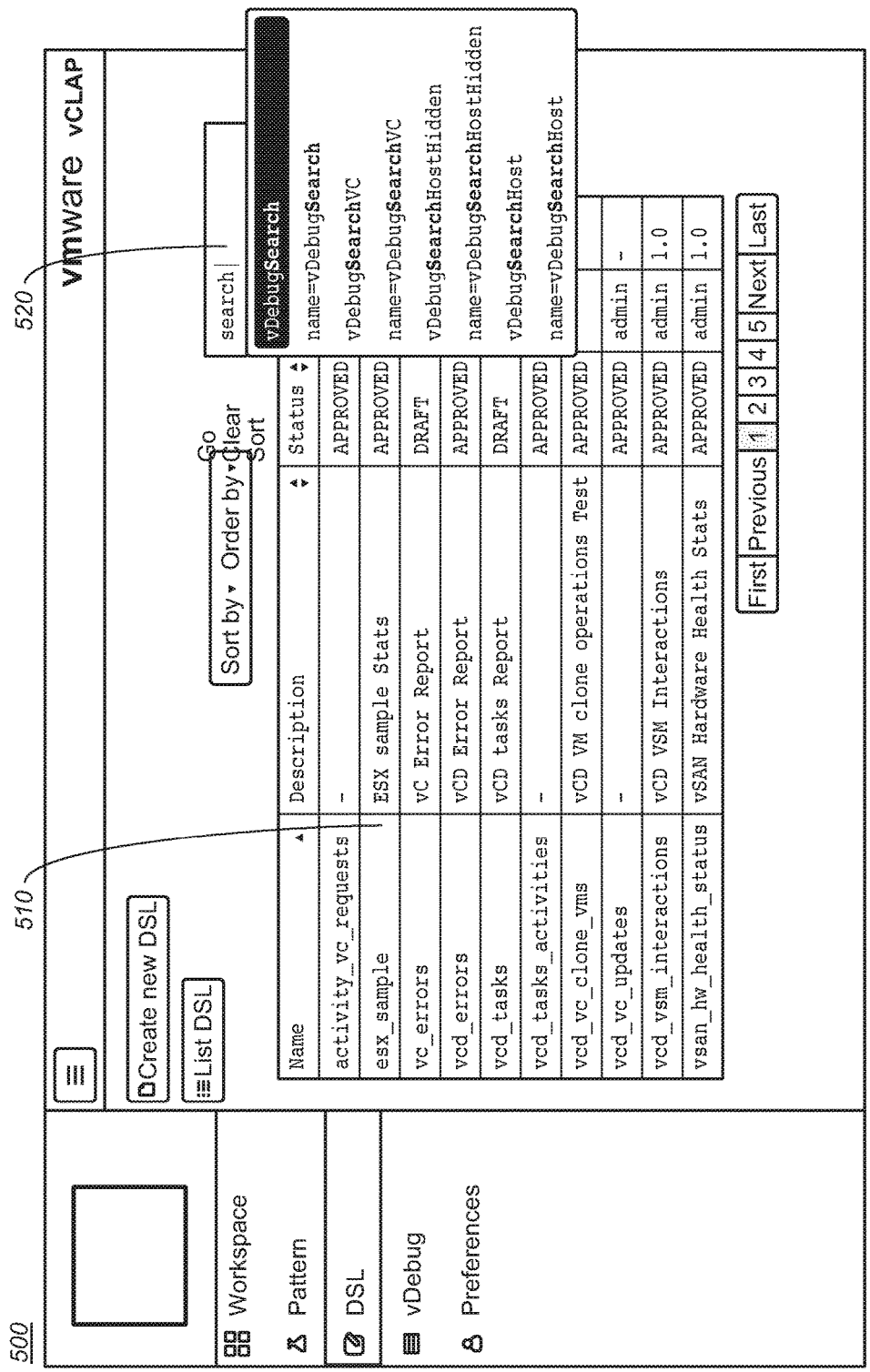
Figure 5C:
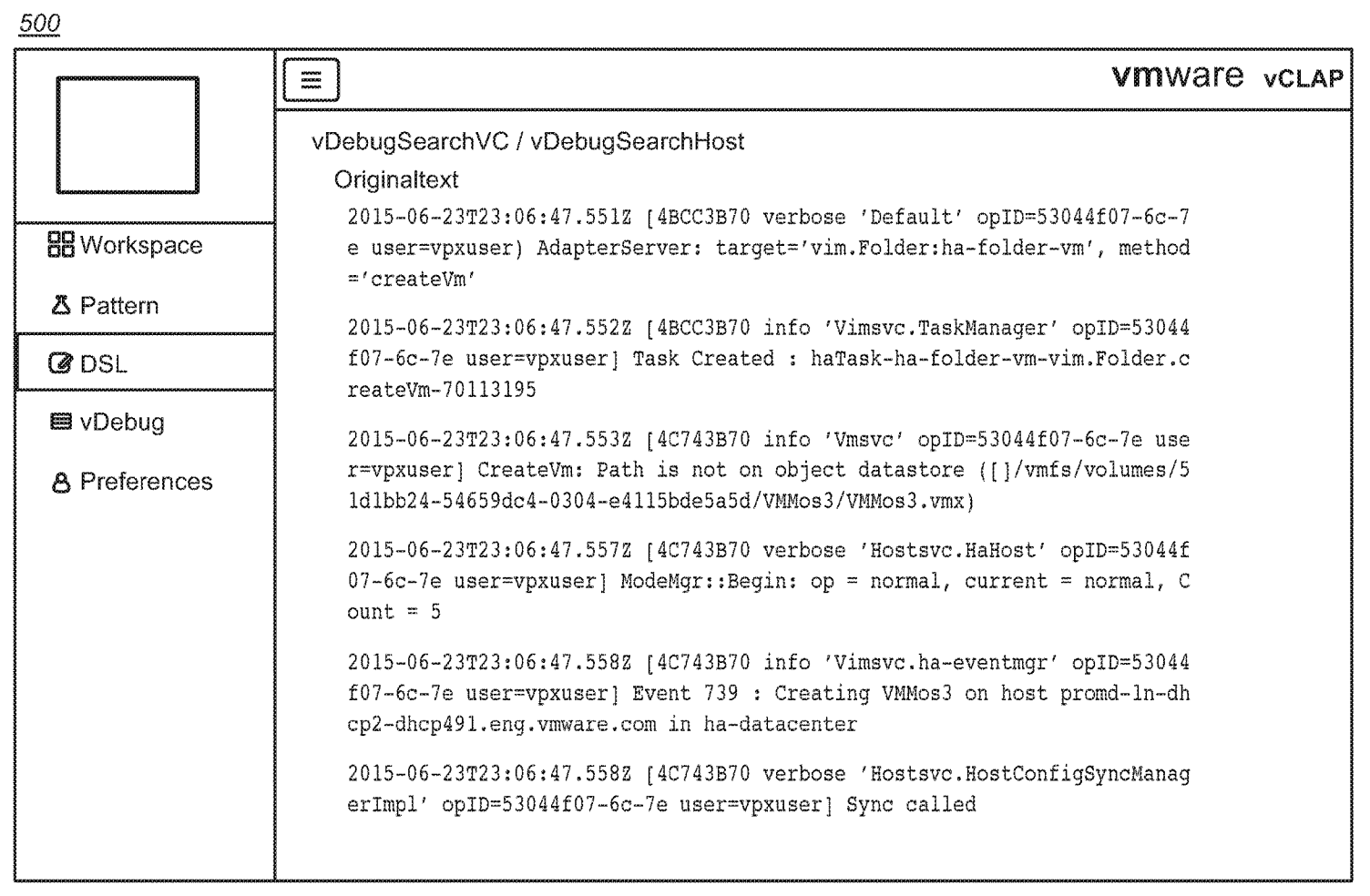

FIGS. 5A-C illustrate screenshots of an example graphical user interface 500 for searching and executing save scripts, in accordance with various embodiments. As shown in FIG. 5A, graphical user interface 500 includes a list 510 of stored scripts (e.g., stored in script repository 250 of FIG. 2) that were, for instance, generated using graphical user interface 400 as described above. Search box 520 is provided for allowing for users to search through stored scripts of list 510.

FIG. 5B illustrates an example screenshot for which the script generated in FIGS. 4I through 4K is performed on a log file. As shown, variables associated with "opid" are shown in column 530, and the corresponding line of the log file is shown in column 532. FIG. 5C illustrates an example screenshot in which a particular string (e.g., opid) "53044f07-6c" has been selected in FIG. 5B. As shown in FIG. 5C, all log lines of the log file including the string "53044f07-6c" are shown in graphical user interface 500.

Example Methods of Operation

Figure 6:
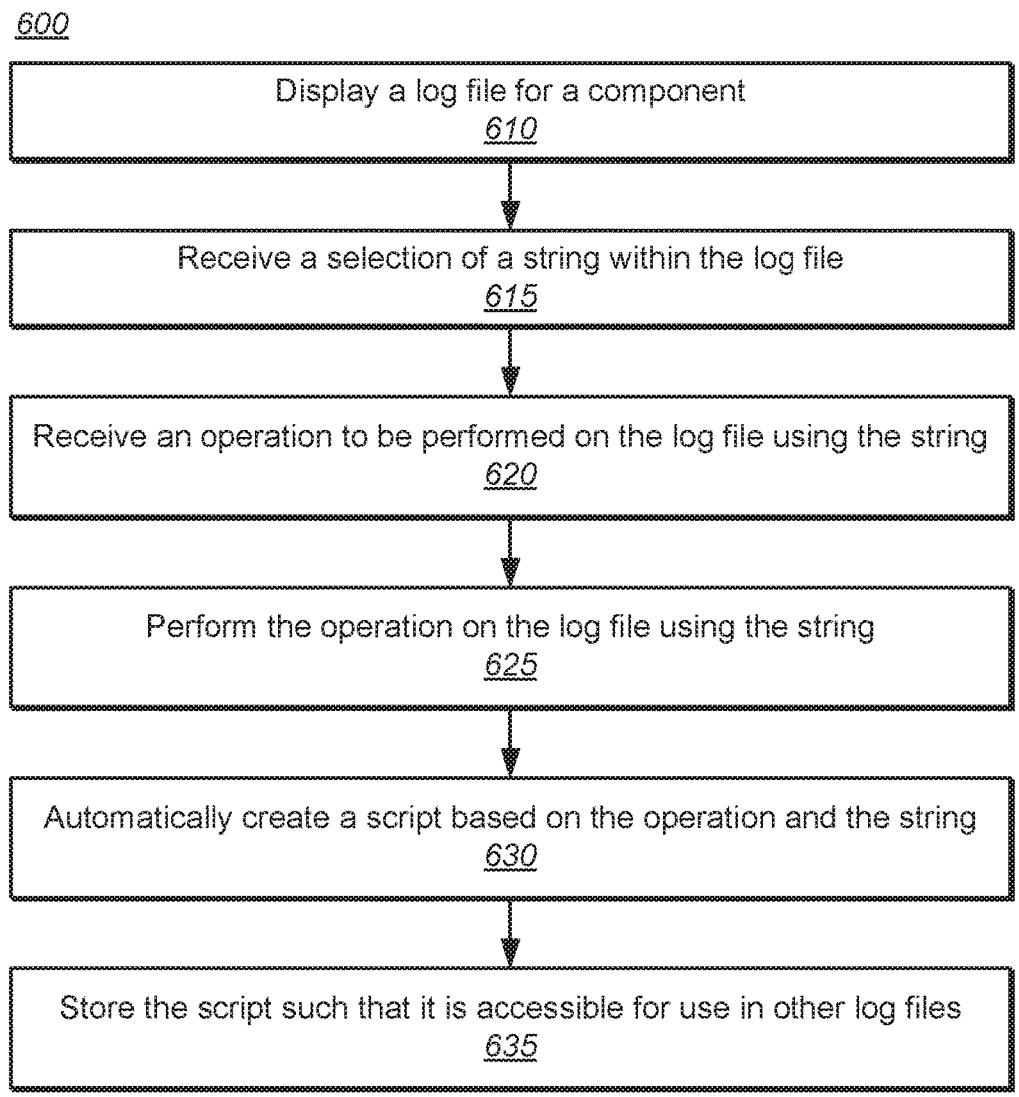
FIGS. 6, 7 and 8 illustrate flow diagrams of example methods for automating script creation for a log file, according to various embodiments.
Figure 7:
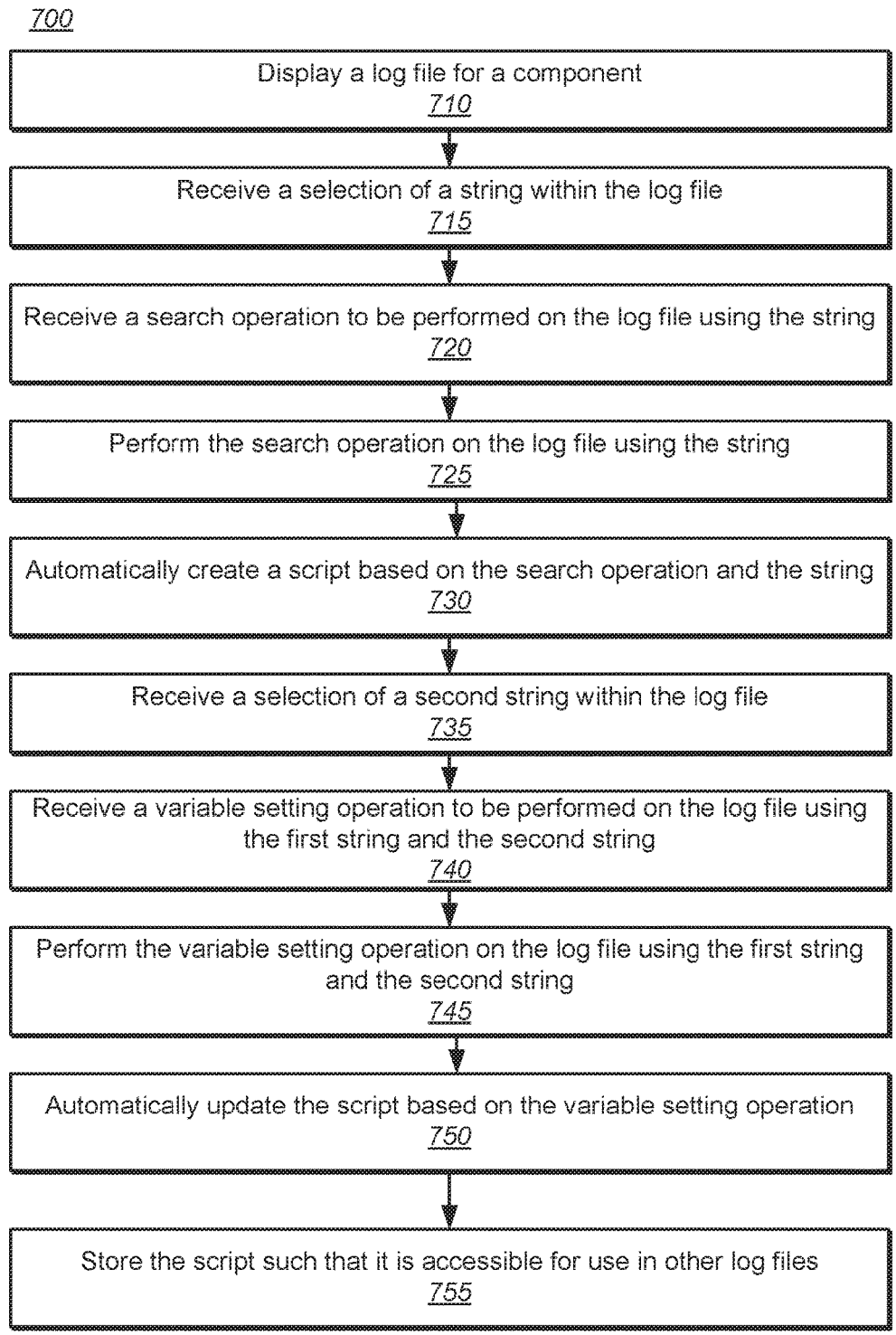
Figure 8:
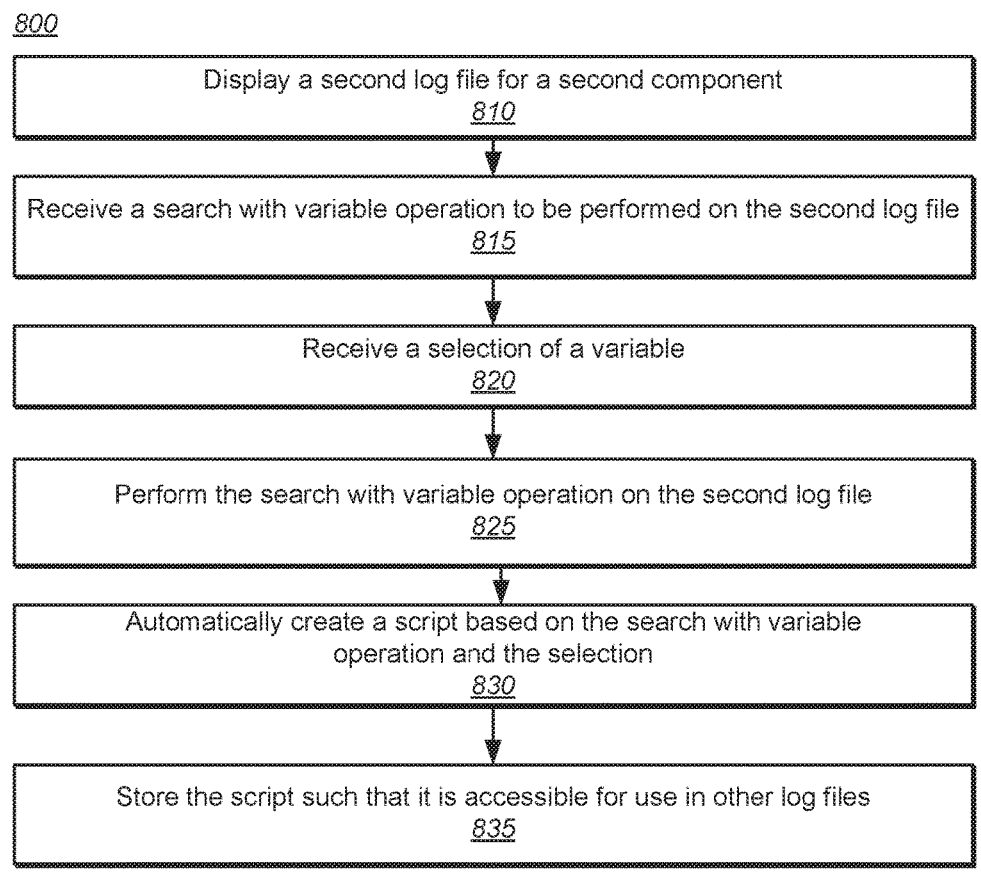

FIGS. 6, 7 and 8 illustrate flow diagrams 600, 700 and 800 of example methods for automating script generation for a log file, according to various embodiments. Procedures of these methods may be described with reference to elements and/or components of FIGS. 1, 2, 3A, 3B, 4A-4K and 5A-5C. It is appreciated that in some embodiments, the procedures may be performed in a different order than described, that some of the described procedures may not be performed, and/or that one or more additional procedures to those described may be performed. Flow diagrams 600, 700 and 800 include some procedures that, in various embodiments, are carried out by one or more processors under the control of computer-readable and computer-executable instructions that are stored on non-transitory computer-readable storage media. It is further appreciated that one or more procedures described in flow diagrams 600, 700 and 800 may be implemented in hardware, or a combination of hardware with firmware and/or software.

With reference to FIG. 6, at procedure 610 of flow diagram 600, in various embodiments, a log file for a component is displayed (e.g., within log file viewer 310). In one embodiment, a second log file is displayed (e.g., within log file viewer 320) for a second component, wherein the component and the second component are correlated. At procedure 615, a selection of a string within the log file is received. At procedure 620, an operation to be performed on the log file using the string is received (e.g., at operation selector 312). In various embodiments, the operations available for selection include, without limitation: a search operation, a variable setting operation, and a search with variable operation.

At procedure 625, the operation is performed on the log file using the string. In one embodiment, where the operation is a search operation, the search operation filters the log file according to the first such that only lines of the log file comprising the first are displayed. At procedure 630, a script is automatically created based on the operation and the string. In one embodiment, the script is displayed (e.g., within script viewer 316). At procedure 635, the script is stored such that it is accessible for use in other log files (e.g., at script repository 250).

With reference to FIG. 7, at procedure 710 of flow diagram 700, in various embodiments, a log file for a component is displayed (e.g., within log file viewer 320). In one embodiment, a second log file is displayed (e.g., within log file viewer 330) for a second component, wherein the component and the second component are correlated. At procedure 715, a selection of a first string within the log file is received. At procedure 720, a search operation to be performed on the log file using the first string is received (e.g., at operation selector 322).

At procedure 725, the search operation is performed on the log file using the first string. In one embodiment, the search operation filters the log file according to the first string such that only lines of the log file comprising the first are displayed. At procedure 730, a script is automatically created based on the operation and the string. In one embodiment, the script is displayed (e.g., within script viewer 326). At procedure 735, a selection of a second string within the log file is received. At procedure 740, a variable setting operation to be performed on the log file using the first string and the second string is received (e.g., at operation selector 322).

At procedure 745, the variable setting operation is performed on the log file using the first string and the second string. In one embodiment, the variable setting operation includes defining the first string as a search pattern and the defining the second string as a variable associated with the search pattern. At procedure 750, the script is updated based on the variable setting operation. In one embodiment, the updated script is displayed (e.g., within script viewer 326). At procedure 755, the script is stored such that it is accessible for use in other log files (e.g., at script repository 250).

In various embodiments, a variable setting operation performed on a first log file, as described in FIG. 7, may be utilized to perform a variable search operation on a second log file. With reference to FIG. 8, at procedure 810 of flow diagram 800, in various embodiments, a second log file for a second component is displayed (e.g., within log file viewer 330). At procedure 815, a search with variable operation to be performed on the second log file is received (e.g., at operation selector 332). At procedure 820, a selection of a variable is received.

At procedure 825, the search with variable operation is performed on the log file using the selected variable. In one embodiment, the search with variable operation filters the second log file according to the selected variable such that only lines of the log file comprising a value for the variable (e.g., a variable corresponding to the search pattern) are displayed (e.g., at script viewer 336). At procedure 830, a script is automatically created based on the search with variable operation and the selected variable. In one embodiment, the script is displayed. At procedure 835, the script is stored such that it is accessible for use in other log files (e.g., at script repository 250).

Conclusion

The examples set forth herein were presented in order to best explain, to describe particular applications, and to thereby enable those skilled in the art to make and use embodiments of the described examples. However, those skilled in the art will recognize that the foregoing description and examples have been presented for the purposes of illustration and example only. The description as set forth is not intended to be exhaustive or to limit the embodiments to the precise form disclosed. Rather, the specific features and acts described above are disclosed as example forms of implementing the claims.

Reference throughout this document to "one embodiment," "certain embodiments," "an embodiment," "various embodiments," "some embodiments," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics of any embodiment may be combined in any suitable manner with one or more other features, structures, or characteristics of one or more other embodiments without limitation.

What is claimed is:

1. A method for automating script creation for a log file, the method comprising:
    displaying a first log file for a first component;
    receiving a first selection of a string within the first log file;
    receiving a search operation to be performed using the string;
    performing the search operation on a second log file using the string, wherein the second log file corresponds to a second component;
    receiving a second selection of a variable in the second log file;
    automatically creating a script based on the search operation using the variable;
    storing the script such that it is accessible for use in other log files;
    running the script on a third log file associated with a third component; and
    displaying an output from the third log file that filters entries based on the string from the first log file and the variable from the second log file.

2. The method of claim 1, wherein the performing the search operation on the second log file using the string comprises:
    filtering the second log file such that only lines of the second log file including the search string are displayed.

3. The method of claim 2, wherein the second selection includes a second string within the second log file.

4. The method of claim 3, wherein the search operation further comprises a variable setting operation, the method further comprising:
    automatically updating the script based on the variable setting operation, the string and the second string, wherein the string defines a static search pattern and the second string defines a variable associated with the static search pattern, such that executing the script on the third log file generates an output list of variables associated with the static search pattern.

5. The method of claim 4, wherein the performing the search operation on the second log file using the string further comprises:
    receiving a label for the variable.

6. The method of claim 1, further comprising:
    displaying the second log file for the second component, wherein the component and the second component are correlated.

7. The method of claim 6, further comprising:
    receiving a variable search operation to be performed on the second log file;
    performing the variable search operation on the second log file;
    automatically creating a second script based on the variable search operation performed on the second log file; and
    storing the second script such that it is accessible for use in other log files.

8. In a computer system having a graphical user interface including a display device and a user interface selection device, a method for automating script creation for a log file in a graphical user interface, the method comprising:
    providing a graphical user interface comprising:
        a first log file viewer for displaying a first log file for a first component, wherein text of the first log file is selectable;
        a second log file viewer for displaying a second log file for a second component, wherein text of the second log file is selectable, wherein the first component and the second component are correlated;
        a first operation selector for selection of an operation to be performed on the first log file; and
        a second operation selector for selection of an operation to be performed on the second log file;
    displaying the first log file within the first log file viewer;
    receiving a selection of a first string of the first log file within the first log file viewer;
    receiving, at the first operation selector, a first operation to be performed on the first log file using the first string;
    performing the first operation on the first log file using the first string;
    automatically creating a first script based on the first operation and the first string;
    storing the first script such that it is accessible for use in other log files;
    receiving a second selection of a variable in the second log file;
    running, on a third log file associated with a third component, the first operation using the variable; and
    displaying filtered entries from the third log file based on the string from the first log file and the variable from the second log file.

9. The method of claim 8, wherein the first operation received at the first operation selector comprises a search operation, wherein the performing the first operation on the first log file using the first string comprises:
    filtering the first log file according to the first script such that only lines of the first log file comprising the first script are displayed within the first log file viewer.

10. The method of claim 9, further comprising:
    receiving a selection of a second string of the first log file within the first log file viewer; and
    receiving, at the first operation selector, a variable setting operation to be performed on the first log file using the first string and the second string.

11. The method of claim 10, further comprising:
    performing the variable setting operation on the first log file using the first string and the second string; and
    automatically updating the first script based on the variable setting operation, the first string and the second string, wherein the first string defines a static search pattern and the second string defines a variable associated with the static search pattern, such that executing the first script on any log file will generate an output list of variables associated with the static search pattern.

12. The method of claim 11, wherein the performing the variable setting operation on the first log file using the first string and the second string comprises:
    displaying a text field for receiving a label for the variable; and
    receiving the label for the variable.

13. The method of claim 8, further comprising:
    receiving, at the second operation selector, a variable search operation to be performed on the second log file;
    displaying a variable selector for receiving a selection of a variable to search;
    receiving the selection of the variable;

performing the variable search operation on the second log file within the second log file viewer;

automatically creating a second script based on the variable search operation performed on the second log file; and storing the second script such that it is accessible for use in other log files.

14. The method of claim 8, wherein the graphical user interface further comprises a first script viewer for displaying the first script, the method further comprising displaying the first script within the first script viewer.

15. A non-transitory, computer readable storage medium having computer readable program code stored thereon for causing a computer system to perform a method for automating script creation for a log file, the method comprising:

displaying a first log file for a first component;

receiving a selection of a first string within the first log file;

receiving a search operation to be performed using the first string;

performing the search operation on the first log file using the first string;

automatically creating a script based on the search operation and the first string;

receiving a selection of a second string within a second log file, wherein the second log file corresponds to a second component;

receiving a set as variable operation to be performed using the first string and the second string;

performing the set as variable operation on the second log file using the first string and the second string;

automatically updating the script based on the set as variable operation, the first string and the second string, wherein the first string defines a search pattern and the second string defines a variable associated with the search pattern, such that executing the script on any log file will generate an output list of variables associated with the search pattern;

storing the script such that it is accessible for use in other log files;

running, on a third log file associated with a third component, the script; and displaying filtered entries from the third log file based on the search pattern from the first log file and the variable from the second log file.

16. The non-transitory computer readable storage medium of claim 15, wherein the performing the search operation on the first log file using the first string comprises:

filtering the first log file according to the first string such that only lines of the first log file comprising the first string are displayed.

17. The non-transitory computer readable storage medium of claim 15, further comprising:

displaying the script.

18. The non-transitory computer readable storage medium of claim 15, further comprising:

displaying the second log file for the second component, wherein the first component and the second component are correlated.

19. The non-transitory computer readable storage medium of claim 18, further comprising:

receiving a search with variable operation to be performed on the third log file;

performing the search with variable operation on the third log file; and automatically creating a second script based on the search with variable operation and the variable selection.

20. The non-transitory computer readable storage medium of claim 19, wherein the performing the search with variable operation on the third log file comprises:

filtering the third log file according to the variable such that only lines of the third log file comprising a variable corresponding to the search pattern are displayed.

* * * * *